US012471049B2

(12) United States Patent
Sugawara

(10) Patent No.: US 12,471,049 B2
(45) Date of Patent: Nov. 11, 2025

(54) USER EQUIPMENT (UE) AND COMMUNICATION CONTROL METHOD

(71) Applicant: SHARP KABUSHIKI KAISHA, Sakai (JP)

(72) Inventor: Yasuo Sugawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 288 days.

(21) Appl. No.: 18/012,835

(22) PCT Filed: Jun. 23, 2021

(86) PCT No.: PCT/JP2021/023795
§ 371 (c)(1),
(2) Date: Dec. 23, 2022

(87) PCT Pub. No.: WO2021/261522
PCT Pub. Date: Dec. 30, 2021

(65) Prior Publication Data
US 2023/0262637 A1    Aug. 17, 2023

(30) Foreign Application Priority Data
Jun. 26, 2020   (JP) .................... 2020-110226

(51) Int. Cl.
*H04W 60/00* (2009.01)
*H04W 36/14* (2009.01)
*H04W 84/04* (2009.01)

(52) U.S. Cl.
CPC ......... *H04W 60/00* (2013.01); *H04W 36/142* (2023.05); *H04W 84/042* (2013.01)

(58) Field of Classification Search
CPC . H04W 60/00; H04W 36/142; H04W 84/042; H04W 60/06; H04W 60/04; H04W 88/06; H04W 8/18
See application file for complete search history.

(56) References Cited

U.S. PATENT DOCUMENTS

2021/0289404 A1*  9/2021  Tseng .................... H04W 48/18
2022/0311810 A1*  9/2022  Matolia ................ H04L 65/1104

FOREIGN PATENT DOCUMENTS

WO     2020092173 A1    5/2020

OTHER PUBLICATIONS

3GPP TS 23.501 V16.4.0 (Mar. 2020) 3rd Generation Partnership Project; Technical Specification Group Services and System Aspects; System architecture for the 5G System (5GS); Stage 2 (Release 16).
3GPP TS 23.502 V16.4.0 (Mar. 2020) 3rd Generation Partnership Project; Technical Specification Group Services and System Aspects; Procedures for the 5G System (5GS); Stage 2 (Release 16).

(Continued)

*Primary Examiner* — Marisol Figueroa
(74) *Attorney, Agent, or Firm* — ScienBiziP, P.C.

(57) ABSTRACT

A User Equipment (UE) includes a controller. In a case of connection to a Public Land Mobile Network (PLMN) service via a Stand-alone Non-Public Network (SNPN) by using 3GPP access, the controller does not operate in an SNPN access mode over non-3GPP access.

3 Claims, 12 Drawing Sheets

(56) References Cited

OTHER PUBLICATIONS

3GPP TS 24.501 V16.4.1 (Mar. 2020) 3rd Generation Partnership Project; Technical Specification Group Core Network and Terminals; Non-Access-Stratum (NAS) protocol for 5G System (5GS); Stage 3; (Release 16).
3GPP TR 23.700-07 V0.3.0 (Jan. 2020) 3rd Generation Partnership Project; Technical Specification Group Services and System Aspects; Study on enhanced support of non-public networks (Release 17).
MediaTek Inc., "KI #2: Update to KI#2 to clarify the service continuity and simultaneous reception on data services and paging", S2-2004352, 3GPP SA WG2 Meeting #139E(e-meeting), Jun. 1-12, 2020, Elbonia.
Intel, "non-3GPP access not supported in Snpn", C1-202399, 3GPP TSG-CT1 Meeting #123-e, online, Apr. 16, 2020-Apr. 24, 2020, XP052321451, [retrieved on Apr. 9, 2020].
Huawei et al., "Non-3GPP access for PLMN and SNPN", CP-201136, C1-202799, 3GPP TSG-CT WG1 Meeting #123-e, Electronic meeting, Apr. 16, 2020-Apr. 24, 2020, XP052303475, Retrieved from the Internet: URL: https://ftp.3gpp.org/tsg_ct/TSG_CT/TSGC_88e/Docs/CP-201136.zip 24501_CR2177r1_(Rel-16)_C1-202799.docx, [retrieved on Jun. 19, 2020].
China Telecom, "On Private Network Support for NG-RAN", R3-193832, 3GPP TSG-RAN WG3#105, Ljubljana, Slovenia, Aug. 26-30, 2019.

* cited by examiner

USER EQUIPMENT (UE) AND COMMUNICATION CONTROL METHOD

TECHNICAL FIELD

The present invention relates to a User Equipment (UE) and a communication control method. This application claims priority based on JP 2020-110226 filed on Jun. 26, 2020, the contents of which are incorporated herein by reference.

BACKGROUND ART

In the 3rd Generation Partnership Project (3GPP), the system architecture of a 5G System (5GS) corresponding to a fifth generation (5G) mobile communication system has been under study, and discussion for the support of new procedures and new functions has been conducted (see NPLs 1 to 3). The concept of Non-Public Network (NPN) has been introduced into the Release 16 standard, and functional enhancement of NPN has been discussed in Release 17 (see NPL 4).

CITATION LIST

Non Patent Literature

NPL 1: 3GPP TS 23.501 V16.4.0 (2020 March); 3rd Generation Partnership Project; Technical Specification Group Services and System Aspects; System Architecture for the 5G System; Stage 2 (Release 16)

NPL 2: 3GPP TS 23.502 V16.4.0 (2020 March); 3rd Generation Partnership Project; Technical Specification Group Services and System Aspects; Procedures for the 5G System; Stage 2 (Release 16)

NPL 3: 3GPP TS 24.501 V16.4.1 (2020 March); 3rd Generation Partnership Project; Technical Specification Group Core Network and Terminals; Non-Access-Stratum (NAS) protocol for 5G System (5GS); Stage 3 (Release 16)

NPL 4: 3GPP TR 23.700-07 V0.3.0 (2020 January); 3rd Generation Partnership Project; Technical Specification Group Services and System Aspects; Study on enhanced support of non-public networks (Release 17)

SUMMARY OF INVENTION

Technical Problem

In NPL 4, a technique for handover between Standard-alone NPN (SNPN), which is a mode of the NPN, and a PLMN has been under study, but has not yet been discussed sufficiently, leading to no conclusions. Furthermore, according to the NPN specification in Rel-16 (NPLs 1, 2, and 3), the UE is assumed not to operate in an SNPN access mode in a case of connecting to the PLMN, and is assumed to need to operate in the SNPN access mode in a case of connecting to the SNPN. However, in a case connecting to the PLMN via the SNPN, the UE needs to connect to the PLMN after establishing a PDU session in the SNPN. However, it is not clear whether, in this case, the UE needs to operate in the SNPN access mode.

An aspect of the present invention has been made in view of the above-described circumstances, and provides a technique for efficiently performing handover between an SNPN and a PLMN and clarifies whether UE operates in an SNPN access mode in a case of connecting to the PLMN via the SNPN.

Solution to Problem

An embodiment of the present invention provides a User Equipment (UE) including a controller, wherein in a case of connection to a Public Land Mobile Network (PLMN) service via a Stand-alone Non-Public Network (SNPN) by using 3GPP access, the controller does not operate in an SNPN access mode over non-3GPP access.

An embodiment of the present invention provides a communication control method performed by a User Equipment (UE), the communication control method including the step of, in a case of connection to a Stand-alone Non-Public Network (SNPN) service via a Public Land Mobile Network (PLMN) using 3GPP access, the UE does not operate in an SNPN access mode over non-3GPP access.

Advantageous Effects of Invention

Handover between the SNPN and the PLMN can be efficiently performed, and in a case that the UE connects to the PLMN via the SNPN, whether to operate in the SNPN access mode can be clarified.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. Overview of System

Now, a mobile communication system will be described.

Figure 1:
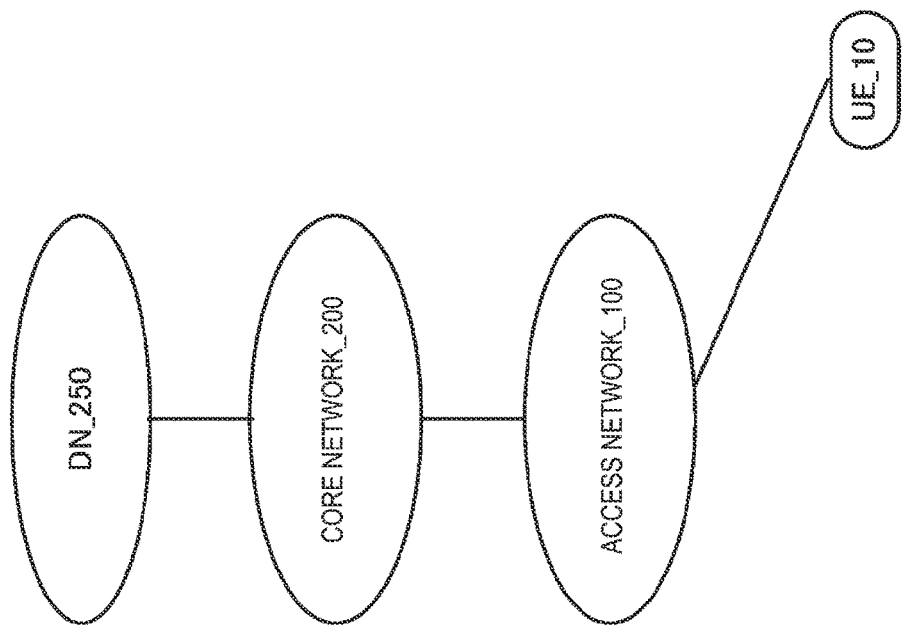
FIG. 1 is a diagram illustrating an overview of a mobile communication system in a case of direct connection to a PLMN.
Figure 2:
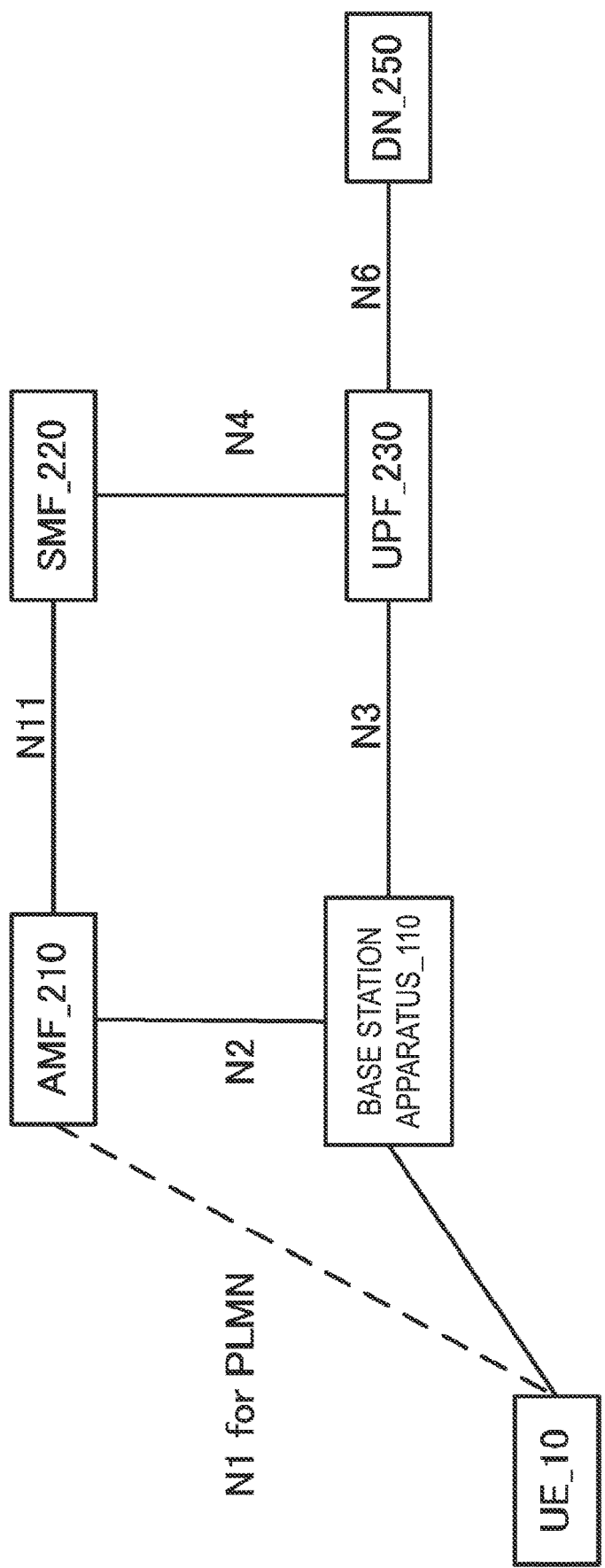
FIG. 2 is a diagram illustrating a detailed configuration of the mobile communication system in a case of direct connection to the PLMN.
Figure 3:
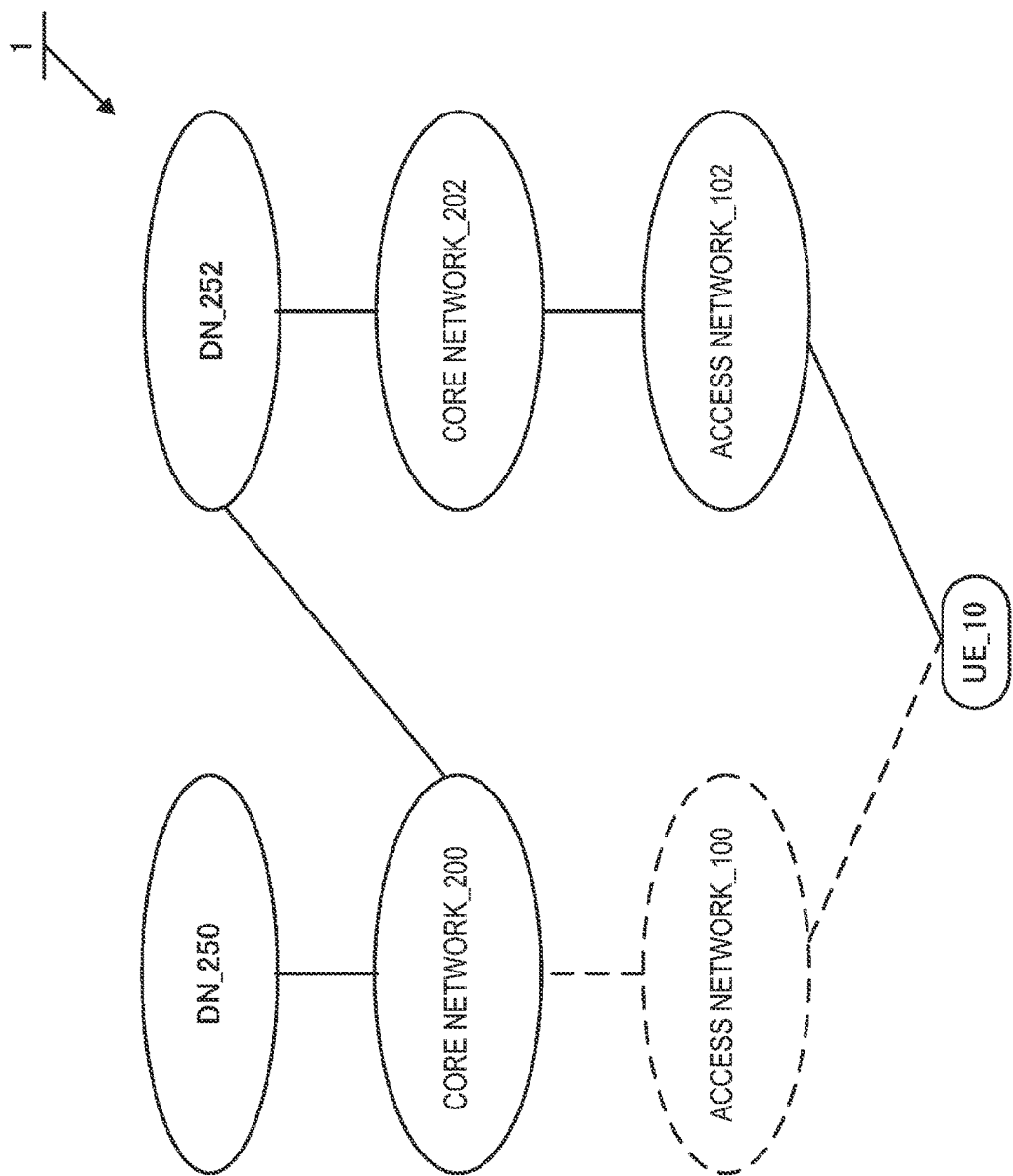
FIG. 3 is a diagram illustrating an overview of the mobile communication system in a case of direct connection to the SNPN and in a case of connection to the PLMN via the SNPN.
Figure 4:
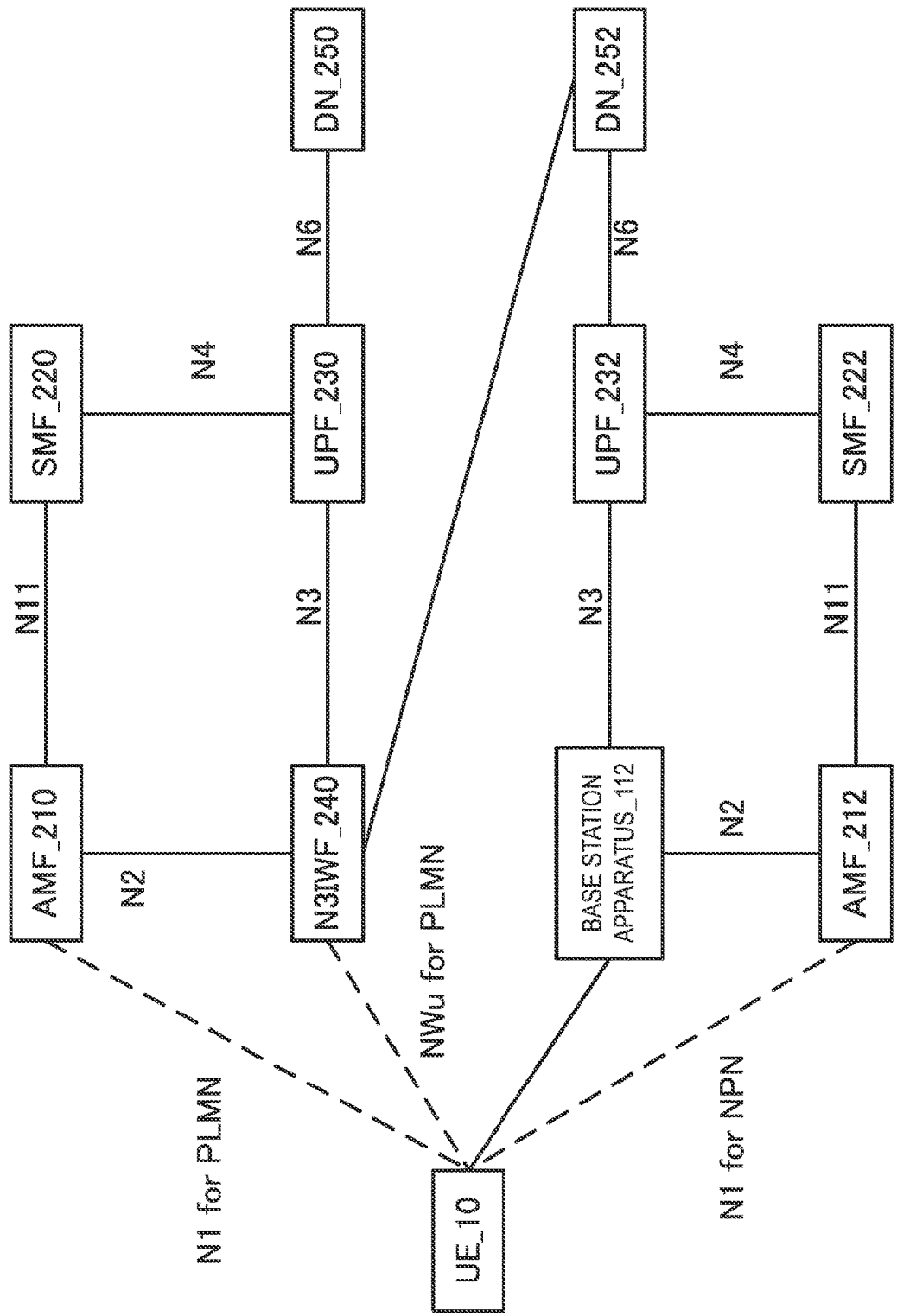
FIG. 4 is a diagram illustrating a detailed configuration of the mobile communication system in the case of direct connection to the SNPN and in the case of connection to the PLMN via the SNPN.

First, FIG. 1 is a diagram schematically illustrating an overview of the mobile communication system in a case of direct connection to a PLMN, and FIG. 2 is a diagram illustrating a detailed configuration of the mobile communication system. FIG. 3 is a diagram illustrating an overview of the mobile communication system in a case of direct connection to the SNPN, and an overview of the mobile communication system in a case of connection to the PLMN via the SNPN, and FIG. 4 is a diagram illustrating a detailed configuration such mobile communication systems.

FIG. 1 illustrates that the mobile communication system 1 includes a User Equipment (UE)_10, an access network_100, a core network_200, and a Data Network (DN)_250. Note that, with the symbols omitted, the above-described apparatus and networks may be described as the UE, access networks, core networks, DN, and the like. Here, the access network in FIG. 1 may involve 3GPP access or non-3GPP access, but preferably involves 3GPP access.

FIG. 2 illustrates apparatus and network functions such as the UE_10, a base station apparatus_110, an Access and Mobility Management Function (AMF)_210, a Session Management Function (SMF)_220, a User Plane Function (UPF)_230, and the DN_250, and interfaces connecting these apparatuses and network functions to one another.

FIG. 3 illustrates that the communication system includes a User Equipment (UE)_10, an access network_102, a core network_202, a Data Network (DN)_252, a core network_200, and a Data Network (DN)_250. Here, in a case of directly connecting to the SNPN, the mobile communication system may include the UE_10, the access network_102, the core network_202, and the Data Network (DN)_252. Here, the access network_102 in FIG. 3 may involve 3GPP access or non-3GPP access, but preferably involves 3GPP access.

In a case of connecting to the PLMN via that SNPN, the mobile communication system may include the UE_10, the access network, the core network_200, and the Data Network (DN)_250. At this time, the access network between the UE_10 and the core network_200 may include the access network_102, the core network_202, and the Data Network (DN)_252. Here, the access network may involve 3GPP access or non-3GPP access, but preferably involves non-3GPP access.

FIG. 4 illustrates apparatus and network functions such as the UE_10, a base station apparatus_112, the AMF_210, an AMF_212, the SMF_220, an SMF_222, a UPF_230, a UPF_232, an N3IWF_240, the DN_250, and a DN_252 and interfaces connecting the apparatus and network functions to one another.

Note that a 5GS (5G System) that is a 5G system includes a UE, an access network, and a core network, but may further include a DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus such as a mobile phone or a smartphone which can perform wireless communication, and may be a terminal apparatus that can connect to an Evolved Packet System (EPS) corresponding to a 4G system as well as to a 5GS. The UE may include a Universal Integrated Circuit Card (UICC) and an Embedded UICC (eUICC). Note that the UE may be referred to as a user equipment or a terminal apparatus.

The access network may be referred to as a 5G access network (5G AN). The 5G AN includes an NG Radio Access Network (NG-RAN) and/or a non-3GPP Access Network (non-3GPP an).

One or more base station apparatuses are allocated in the NG-RAN. The base station apparatus may be a gNB. The gNB is a node that provides the UE with a New Radio (NR) user plane and control plane and that connects to a 5GC via an NG interface (including an N2 interface or N3 interface). In other words, the gNB is a base station apparatus newly designed for the 5GS, and includes functions different from the functions of a base station apparatus (eNB) used in the EPS. In a case that there are multiple gNBs, the gNBs are connected to each other via, for example, an Xn interface. Note that each of the base station apparatus_110 and the base station apparatus_112 corresponds to a gNB.

The NG-RAN may hereinafter be referred to as the 3GPP access. The non-3GPP AN may be referred to as non-3GPP access. Nodes allocated in the access network may also be collectively referred to as NG-RAN nodes.

The access network and/or an apparatus included in an apparatus included in the access network may be referred to as an access network apparatus.

Note that each of the access network_100 and the access network_102 corresponds to 3GPP access.

The base station apparatus_110 is allocated in the access network_100, and the base station apparatus_112 is allocated in the access network_102.

The N3IWF in FIG. 4 is used for UnTrusted Non-3GPP access.

The core network corresponds to a 5GC (5G Core Network). In the 5GC, for example, AMFs, UPFs, SMFs, PCFs, and the like are allocated. Here, the 5GC may be represented as 5GCN.

The N3IWF may be allocated in the access network_102 or the core network_200 but is preferably allocated in the core network.

The core network and/or an apparatus included in the core network may hereinafter be referred to as a core network apparatus.

The core network may refer to an IP mobile communication network that is operated by a Mobile Communication Network Operator (MNO) and connects an access network and a DN, or may be a core network for a mobile communication network operator operating and managing the mobile communication system 1, or may be a core network for a Mobile Virtual Network Operator (MVNO), a Mobile Virtual Network Enabler (MVNE), or the like.

The DN may be a DN providing a communication service to the UE. Note that the DN may be configured as a packet data service network, or configured for each service. Furthermore, the DN may include a connected communication terminal. Thus, connecting with the DN may be connecting with a communication terminal or a server apparatus allocated in the DN. Furthermore, transmission and/or reception of user data to and/or from the DN may be transmission and/or reception of the user data to and/or from a communication terminal or a server apparatus allocated in the DN.

Hereinafter, at least a portion of the access network, the core network, or the DN, and/or one or more apparatuses included in these networks may be referred to as a network or network apparatus. Specifically, the expression "the network and/or the network apparatus transmits and/or receives a message and/or performs a procedure" may signify that "at least a portion of the access network, the core network, or the DN, and/or one or more apparatuses included in these networks transmits and/or receives a message and/or performs a procedure".

The UE can be connected to the access network. The UE can be connected to the core network over the access network. Furthermore, the UE can connect to the DN via the access network and the core network. In other words, the UE can transmit and/or receive (communicate) user data to and/or from the DN. In a case of transmitting and/or receiving user data, the UE may use not only Internet Protocol (IP) communication but also non-IP communication.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included.

Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each of the storage units (storage unit_340, storage unit_440, and storage unit_540) in the apparatuses and functions appearing below includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE.

2.1. Apparatus Configuration of UE

Figure 5:
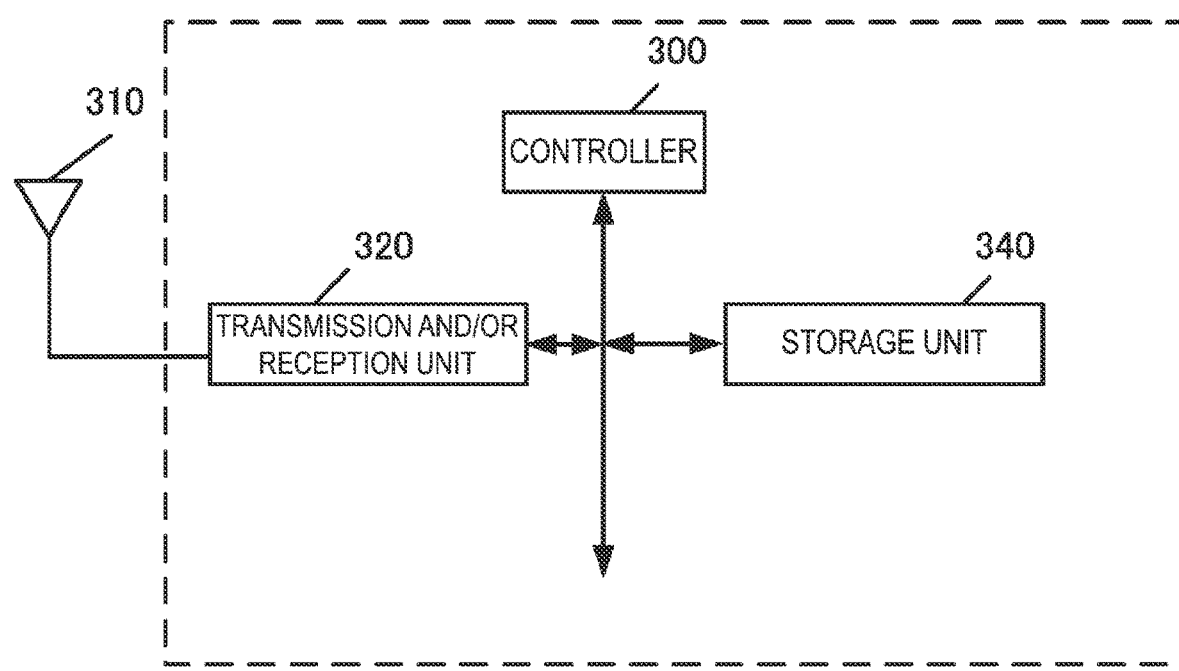
FIG. 5 is a diagram illustrating an apparatus configuration of a UE.

First, an apparatus configuration example of the User Equipment (UE) will be described with reference to FIG. 5. The UE includes a controller_300, an antenna_310, a transmission and/or reception unit_320, and a storage unit_340. The controller_300, the transmission and/or reception unit_320, and the storage unit_340 are connected via a bus. The transmission and/or reception unit_320 is connected to the antenna_310.

The controller_300 is a function unit for controlling the operation and function of the entire UE. Note that the controller_300 may process all functions not included in other function units (the transmission and/or reception unit_320 and the storage unit_340) in the UE. The controller_300 reads and performs various programs stored in the storage unit_340 as necessary, and thereby implements various types of processing in the UE.

The transmission and/or reception unit_320 is a function unit for wirelessly communicating with a base station apparatus or the like in the access network via the antenna_310. In other words, with the use of the transmission and/or reception unit_320, the UE can transmit and/or receive user data and/or control information to and/or from the access network apparatus, and/or the core network apparatus, and/or the PDN, and/or the DN.

The UE can communicate with the base station apparatus (gNB) in the 5G AN with the use of the transmission and/or reception unit_320. The UE can transmit and/or receive a Non-Access-Stratum (NAS) message to and/or from the AMF over the N1 interface with the use of the transmission and/or reception unit_320.

The storage unit_340 is a function unit for storing programs, user data, control information, and the like necessary for each operation of the UE. The storage unit_340 may have a function to store control information transmitted and/or received between the access network apparatus, the core network apparatus, and the DN.

2.2. Apparatus Configuration of gNB (Base Station Apparatus_110 and Base Station Apparatus_112)

Figure 6:
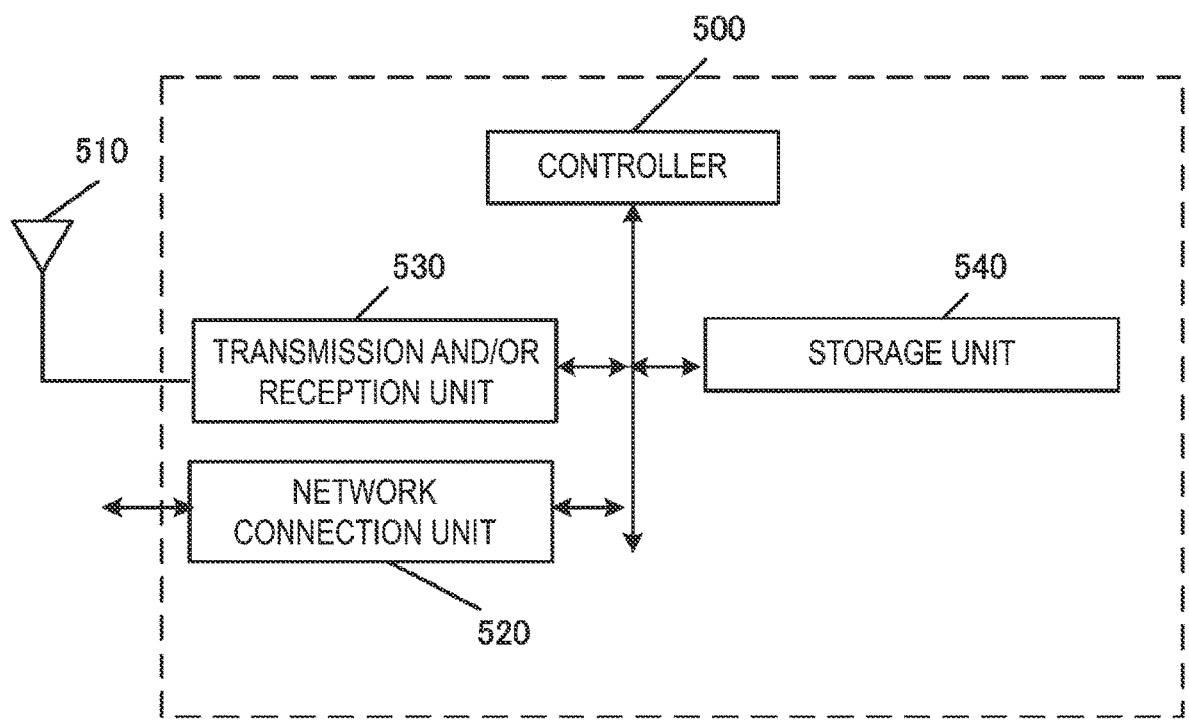
FIG. 6 is a diagram illustrating a configuration of an access network apparatus (gNB) in a 5GS.

Next, an apparatus configuration example of the gNB will be described with reference to FIG. 6. The gNB includes a controller_500, an antenna_510, a network connection unit_520, a transmission and/or reception unit_530, and a storage unit_540. The controller_500, the network connection unit_520, the transmission and/or reception unit_530, and the storage unit_540 are connected via a bus. The transmission and/or reception unit_530 is connected to the antenna 510.

The controller_500 is a function unit that controls the entire operations and functions of the gNB. Note that the controller_500 may process all of the functions that are not included in the functions of the other function units of the base station apparatus_110 (the network connection unit_520, the transmission and/or reception unit_530, and the storage unit_540). The controller_500 reads and performs various programs stored in the storage unit_540 as necessary, and thus implements various types of processing in the gNB.

The network connection unit_520 is a function unit for the gNB to communicate with the AMF and/or the UPF. In other words, with the use of the network connection unit_520, the gNB can transmit and/or receive user data and/or control information to and/or from the AMF and/or the UPF.

The transmission and/or reception unit_530 is a function unit for performing radio communication with the UE via the antenna 510. In other words, with the use of the transmission and/or reception unit_530, the gNB can transmit and/or receive user data and/or control information to and/or from the UE.

With the use of the network connection unit_520, the gNB in the 5G AN can communicate with the AMF over the N2 interface and can communicate with the UPF over the N3 interface. The gNB can communicate with the UE with the use of the transmission and/or reception unit_530.

The storage unit_540 is a function unit for storing programs, user data, control information, and the like necessary for each operation of the gNB. The storage unit_540 may have a function to store control information transmitted and/or received among the UE, another access network apparatus (base station apparatus), the core network apparatus, and the DN.

2.3. Apparatus Configuration of AMF (AMF_210 and AMF_212)

Figure 7:
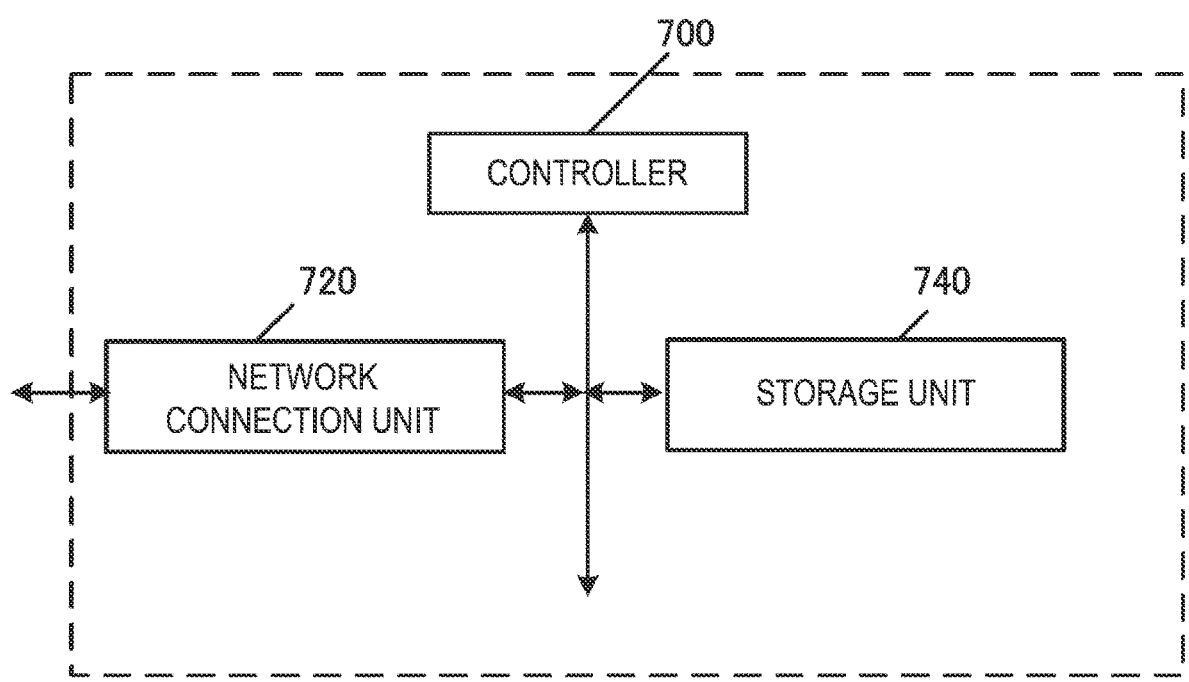
FIG. 7 is a diagram illustrating a configuration of a core network apparatus (AMF/SMF/UPF) in the 5GS.

Now, an apparatus configuration example of the AMF will be described with reference to FIG. 7. The AMF includes a controller_700, a network connection unit_720, and a storage unit_740. The controller_700, the network connection unit_720, and the storage unit_740 are connected via a bus. The AMF may be a node that handles the control plane (also referred to as the C-plane).

The controller_700 is a function unit that controls the entire operations and functions of the AMF. Note that the controller_700 may process all of the functions that are not included in the functions of the other function units of the AMF (the network connection unit_720 and the storage unit_740). The controller_700 reads and performs various programs stored in the storage unit_740 as necessary, and thereby implements various types of processing in the AMF.

The network connection unit_720 is a function unit for the AMF to connect to the base station apparatus, and/or the N3IWF, and/or other AMF, and/or the SMF, and/or the PCF, and/or the Network Service Selection Function (NSSF), and/or the Unified Data Management (UDM), and/or the SCEF. In other words, with the use of the network connection unit_720, the AMF can transmit and/or receive user data and/or control information to and/or from the base station apparatus, and/or the N3IWF, and/or another AMF, and/or the SMF, and/or the PCF, and/or the NSSF, and/or the UDM, and/or the SCEF.

With the use of the network connection unit_720, the AMF in the 5GCN can communicate with the base station apparatus or the N3IWF over the N2 interface, can communicate with another AMF over the N14 interface, can communicate with the SMF over the N11 interface, can communicate with the PCF over the N15 interface, can communicate with the NSSF over the N22 interface, and can communicate with the UDM over the N8 interface. The AMF can transmit and/or receive a NAS message to and/or from the UE over the N1 interface with the use of the network connection unit_720. Note that the N1 interface is a logical interface, and thus communication between the UE and the AMF is actually performed over the 5G AN.

The storage unit_740 is a function unit for storing programs, user data, control information, and the like necessary for each operation of the AMF. The storage unit_740 may have a function to store control information transmitted and/or received among the UE, the access network apparatus, another core network apparatus, and the DN.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_10 may start transmission and/or reception of user data and a control message, or may respond to paging. In addition, note that, in a case that each apparatus is 5GMM-REGISTERED, the UE_10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_10 is not known to the network, or may be a state in which the network is in a state of being unable to reach the UE_10. Note that, in a case that each apparatus is 5GMM-DEREGISTERED, the UE_10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be allocated within the core network. The AMF may be a Network Function (NF) that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN. It is desirable that the N3IWF be deployed in the core network.

2.4. Apparatus Configuration of SMF

Now, an apparatus configuration example of the SMF will be described with reference to FIG. 7. The SMF includes the controller_700, the network connection unit_720, and the storage unit_740. The controller_700, the network connection unit_720, and the storage unit_740 are connected via a bus. The SMF may be a node that handles the control plane.

The controller_700 is a function unit that controls the entire operations and functions of the SMF. Note that the controller_500 may process all of the functions that are not included in the functions of the other function units of the SMF (the network connection unit_720 and the storage unit_740). The controller_700 reads and performs various programs stored in the storage unit_740 as necessary, and thereby implements various types of processing in the SMF.

The network connection unit_720 is a function unit for the SMF to connect to the AMF, and/or the UPF, and/or the PCF, and/or the UDM. In other words, with the use of the network connection unit_720, the SMF can transmit and/or receive user data and/or control information to and/or from the AMF, and/or the UPF, and/or the PCF, and/or the UDM.

With the use of the network connection unit_720, the SMF in the 5GCN can communicate with the AMF over the N11 interface, can communicate with the UPF over the N4 interface, can communicate with the PCF via the N7 interface, and can communicate with the UDM over the N10 interface.

The storage unit_740 is a function unit for storing programs, user data, control information, and the like necessary for each operation of the SMF. The storage unit_740 may have a function to store control information transmitted and/or received among the UE, the access network apparatus, another core network apparatus, and the DN.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Now, an apparatus configuration example of the UPF will be described with reference to FIG. 7. The UPF includes the controller_700, the network connection unit_720, and the storage unit_740. The controller_700, the network connection unit_720, and the storage unit_740 are connected via a bus. The UPF may be a node that handles the control plane.

The controller_700 is a function unit that controls the entire operations and functions of the UPF. Note that the controller_700 may process all of the functions that are not included in the functions of the other function units of the AMF (the network connection unit_720 and the storage unit_740). The controller_700 reads and performs various programs stored in the storage unit_740 as necessary, and thus implements various types of processing in the UPF.

The network connection unit_720 is a function unit for the UPF to connect to the base station apparatus (gNB), and/or the SMF, and/or the DN in the 5G AN. In other words, with the use of the network connection unit_720, the UPF can transmit and/or receive user data and/or control information to and/or from the base station apparatus, and/or the N3IWF, and/or the SMF, and/or the DN, and/or the UPF.

With the use of the network connection unit_620, the UPF in the 5GCN can communicate with the base station apparatus or the N3IWF over the N3 interface, can communicate with the SMF over the N4 interface, can communicate with the DN over the N6 interface, and can communicate with another UPF over the N9 interface.

The storage unit_740 is a function unit for storing programs, user data, control information, and the like necessary for each operation of the UPF. The storage unit_740 may have a function to store control information transmitted and/or received among the UE, the access network apparatus, another core network apparatus, and the DN.

The UPF has a function as an anchor point for intra-RAT mobility or inter-RAT mobility, a function as an external PDU session point to be mutually connected with the DN (in other words, a function of transferring user data as a gateway between the DN and the core network), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. Furthermore, the multiple gateways allocated may be gateways connecting the core network with a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and Identification Information According to Present Embodiment Next, other apparatuses and/or functions and identification information will be described.

The network refers to at least a portion of the access network, the core network, or the DN. One or more apparatuses included in at least a portion of the access network, the core network, or the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A Network Slice Selection Function (NSSF) may be a network function (also referred to as an NF) having a function of selecting a network slice serving the UE.

A Network Data Analytics Function (NWDAF) may be an NF having a function of performing data collection from an NF and an application function (also referred to as an AF).

A Policy Control Function (PCF) may be an NF having a function of determining a policy for controlling a behavior of a network.

A Network Repository Function (NRF) may be an NF having a service discovery function. The NRF may be an NF that has a function of providing, in a case of receiving a discovery request of another NF from a certain NF, information of the discovered NF.

A Session Management (SM) message (also referred to as a Non-Access-Stratum (NAS) SM message) may be a NAS message used in a procedure for SM, or may be a control message transmitted and/or received between the UE and the SMF via the AMF. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used for a procedure for MM, and may be a control message transmitted and/or received between the UE_10 and the AMF. Furthermore, the MM message may include a Registration request message, a Registration accept message, a Registration reject message, a De-registration request message, a De-registration accept message, a configuration update command message, a configuration update complete message, a Service request message, a Service accept message, a Service reject message, a Notification message, a Notification response message, and the like.

The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. By establishing a PDU session in the 5GS via the access network and the core network, the UE can transmit and/or receive user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, and access network identification information, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_30/UPF_235 connecting the core network B190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a network operator, and the operator can be identified by a PLMN ID. A PLMN that matches a Mobile Network Code (MNC) and a Mobile Country Code (MCC) of an International Mobile Subscriber Identity (IMSI) of the UE may be a Home PLMN (HPLMN). Furthermore, the UE may hold, in the USIM, an Equivalent HPLMN list for identifying one or multiple Equivalent HPLMNs (EPLMNs). A PLMN different from the HPLMN and/or the EPLMN may be a VPLMN (Visited PLMN). A PLMN with which the UE has successfully registered may be a Registered PLMN (RPLMN). Note that a service provided by the PLMN may be referred to as a PLMN service, or a service provided by the SNPN may be referred to as an SNPN service.

The SNPN is a type of NPN corresponding to a 5GS deployed for non-public use. The SNPN is operated by NPN operators, and is an NPN independent of the NF provided by the PLMN. The SNPN may be identified by a combination of a PLMN ID and an NID. An SNPN-enabled UE may support an SNPN access mode. A UE configured to operate in the SNPN access mode may be able to select and register with the SNPN, and need not be able to select the PLMN. The UE configured to operate in the SNPN access mode may be able to perform an SNPN selection procedure, and need not be able to perform an PLMN selection procedure. Even in a case that the UE is enabled to use the SNPN (SNPN-enabled), a UE not configured to operate in the SNPN access mode need not be able to select or register with the SNPN and may be able to select the PLMN. The UE not configured to operate in the SNPN access mode need not be able to perform the SNPN selection procedure, and may be able to perform the PLMN selection procedure.

Note that the SNPN access mode may be managed and applied on a per-access basis. In other words, the SNPN access mode may be managed and applied separately for 3GPP access and for non-3GPP access. In other words, activation or deactivation of the SNPN access mode for the 3GPP access may be independent of activation or deactivation of the SNPN access mode for the non-3GPP access. In other words, in a case that the SNPN access mode for the 3GPP access is activated, the SNPN access mode for the non-3GPP access may be activated or deactivated. In a case that the SNPN access mode for the 3GPP access is deactivated, the SNPN access mode for the non-3GPP access may be activated or deactivated.

Here, the SNPN access mode for 3GPP access may be referred to as the SNPN access mode over 3GPP access, or the SNPN access mode using 3GPP access.

The SNPN access mode for non-3GPP access may be referred to as the SNPN access mode over non-3GPP access or the SNPN access mode using non-3GPP access.

"Activation" may be interpreted as "operating," and "deactivation" may be interpreted as "not operating." In other words, the SNPN access mode for 3GPP access being activated may mean operating in the SNPN access mode for 3GPP access. The SNPN access mode for 3GPP access being deactivated may mean not operating in the SNPN access mode for 3GPP access may. The SNPN access mode for non-3GPP access being activated may mean operating in the SNPN access mode for non-3GPP access. The SNPN access mode for non-3GPP access being deactivated may mean not operating in the SNPN access mode for non-3GPP access.

The state of the UE may include a first state to a sixth state described below.

Here, the first state is a state in which the UE does not operate in the SNPN access mode. This state may be applied in a case that the SNPN access mode is not managed or applied on a per-access basis.

The second state is a state in which the UE operates in the SNPN access mode. This state may be applied in a case that the SNPN access mode is not managed or applied on a per-access basis.

The third state is a state in which the UE does not operate in the SNPN access mode for 3GPP access and does not operate in the SNPN access mode for non-3GPP access. This state may be provided in a case that the SNPN access mode is managed and applied on a per-access basis.

The fourth state is a state in which the UE does not operate in the SNPN access mode for 3GPP access and operates in the SNPN access mode for non-3GPP access. This state may be provided in a case that the SNPN access mode is managed and applied on a per-access basis.

The fifth state is a state in which the UE operates in the SNPN access mode for 3GPP access and does not operate in the SNPN access mode for non-3GPP access. This state may be provided in a case that the SNPN access mode is managed and applied on a per-access basis.

The sixth state is a state in which the UE operates in the SNPN access mode for 3GPP access and operates in the SNPN access mode for non-3GPP access. This state may be provided in a case that the SNPN access mode is managed and applied on a per-access basis.

In a case of accessing the PLMN or a PLMN service using 3GPP access and not managing or applying the SNPN access mode on a per-access basis, the UE may operate in the first state.

In a case of accessing the PLMN or the PLMN service using 3GPP access and managing and applying the SNPN access mode on a per-access basis, the UE may operate in the third or fourth state.

In a case of accessing the PLMN or the PLMN service using non-3GPP access and not managing or applying the SNPN access mode on a per-access basis, the UE may operate in the first state.

In a case of accessing the PLMN or the PLMN service vi using a non-3GPP access and managing and applying the SNPN access mode on a per-access basis, the UE may operate in the third or fifth state.

In a case of accessing the SNPN or an SNPN service using 3GPP access and not managing or applying the SNPN access mode on a per-access basis, the UE may operate in the second state.

In a case of accessing the SNPN or the SNPN service using 3GPP access and managing and applying the SNPN access mode on a per-access basis, the UE may operate in the fifth or sixth state.

In a case of accessing the SNPN or the SNPN service using non-3GPP access and not managing or applying the SNPN access mode on a per-access basis, the UE may operate in the second state.

In a case of accessing the SNPN or the SNPN service using non-3GPP access and managing and applying the SNPN access mode on a per-access basis, the UE may operate in the fourth or sixth state.

In a case of accessing the PLMN via the SNPN (in a case that the UE has been accessing the SNPN or the SNPN service using 3GPP access, and accesses the PLMN or PLMN service via the SNPN or the SNPN service using non-3GPP access) and not managing or applying the SNPN access mode on a per-access basis, the UE may operate in the first or second state.

In a case of accessing the PLMN via the SNPN (in a case that the UE has been accessing the SNPN or the SNPN service using 3GPP access, and accesses the PLMN or PLMN service via the SNPN or the SNPN service using non-3GPP access) and managing and applying the SNPN access mode on a per-access basis, the UE may operate in the fifth state.

In a case of accessing the PLMN via the SNPN (in a case that the UE has been accessing to the SNPN or the SNPN service using non-3GPP access, and accesses the PLMN or PLMN service via the SNPN or the SNPN service using 3GPP access) and not managing or applying the SNPN access mode on a per-access basis, the UE may operate in the first or second state.

In a case of accessing the PLMN via the SNPN (in a case that the UE has been accessing the SNPN or the SNPN service using non-3GPP access, and accesses the PLMN or PLMN service via the SNPN or the SNPN service using 3GPP access) and managing and applying the SNPN access mode on a per-access basis, the UE may operate in the fourth state.

The SNPN access mode in which the UE connects to the PLMN or the PLMN services via the SNPN may be defined as a new SNPN access mode (e.g., the PLMN access mode via the SNPN) regardless of whether the SNPN access mode is managed and applied on a per-access basis.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network. The NSI may include a virtual Network Function (NF) generated using a Network Slice Template (NST). Here, the NST is associated with a resource request for provision of a requested communication service and capability, and is a logical expression of one or more NFs. Specifically, the NSI may be an aggregation including multiple NFs in the core network. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAIs. Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

The configured NSSAI (also referred to as Configured NSSAI) is NSSAI provided and stored in the UE. The UE may store the configured NSSAI for each PLMN. The configured NSSAI may be information configured by the network (or PLMN). The S-NSSAI included in the configured NSSAI may be represented as configured S-NSSAI. The configured S-NSSAI may include S-NSSAI and mapped S-NSSAI.

The requested NSSAI (also referred to as Requested NSSAI) is NSSAI provided to the network from the UE during the registration procedure. The requested NSSAI may be allowed NSSAI or configured NSSAI stored by the UE. Specifically, the requested NSSAI may be information indicating a network slice that the UE is to access. The S-NSSAI included in the requested NSSAI may be represented as requested S-NSSAI. For example, the requested NSSAI is transmitted in the NAS message transmitted from the UE to the network such as the registration request message or the PDU session establishment request message, or a Radio Resource Control (RRC) message including the Non-Access-Stratum (NAS) message.

The allowed NSSAI (also referred to as Allowed NSSAI) is information indicating one or multiple network slices allowed for the UE. In other words, the allowed NSSAI is information for identifying a network slice to which the UE is allowed by the network to connect. As information of the UE, each of the UE and the network stores and manages the allowed NSSAI for each access (3GPP access or non-3GPP access). The S-NSSAI included in the allowed NSSAI may be represented as allowed S-NSSAI. The allowed S-NSSAI may include S-NSSAI and mapped S-NSSAI.

The mapped S-NSSAI (also referred to as Mapped S-NSSAI) is S-NSSAI of the HPLMN mapped to the S-NSSAI of the registered PLMN in a roaming scenario. The UE may store one or multiple mapped S-NSSAIs mapped to the configured NSSAI and the S-NSSAI included in the Allowed NSSAI of each access type. Further, the UE may store one or multiple mapped S-NSSAIs of the S-NSSAI included in rejected NSSAI.

The rejected NSSAI (also referred to as Rejected NSSAI) is information indicating one or multiple network slices not allowed for the UE. In other words, the rejected NSSAI is information for identifying a network slice to which the UE is not allowed by the network to connect. The rejected NSSAI may be information including one or multiple combinations of S-NSSAI and a reject cause value. Here, the reject cause value is information indicating why the network rejects the corresponding S-NSSAI. The UE and the network may each appropriately store and manage the rejected NSSAI based on the reject cause value associated with each S-NSSAI. Furthermore, the rejected NSSAI may be included in the NAS message transmitted from the network to the UE, such as the registration accept message, the configuration update command, the registration reject message, or in the RRC message including the NAS message. The S-NSSAI included in the rejected NSSAI may be represented as rejected S-NSSAI. The rejected NSSAI may be any of first to third rejected NSSAIs and the pending NSSAI, or a combination thereof. The S-NSSAI included in the rejected NSSAI may be represented as rejected S-NSSAI. The rejected S-NSSAI may include the S-NSSAI and the mapped S-NSSAI.

Here, the first rejected NSSAI is a set of one or more pieces of the S-NSSAI included in the requested NSSAI by the UE, the one or more pieces of S-NSSAI being not available in the current PLMN. The first rejected NSSAI may be Rejected NSSAI for the current PLMN in the 5GS, may be Rejected S-NSSAI for the current PLMN, or may be S-NSSAI included in the Rejected NSSAI for the current PLMN. The first rejected NSSAI may be a rejected NSSAI stored by the UE or the NW, or may be a rejected NSSAI transmitted from the NW to the UE. In a case that the first rejected NSSAI is rejected NSSAI transmitted from the NW to the UE, the first rejected NSSAI may be information including one or multiple combinations of S-NSSAI and a cause value. The reject cause value in this case may be "S-NSSAI is not available in the current PLMN," or may be information indicating that the S-NSSAI associated with the reject cause value is not available in the current PLMN.

The first rejected NSSAI is valid in the entire registered PLMN. In other words, the UE and/or NW may treat the first rejected NSSAI and the S-NSSAI included in the first rejected NSSAI as information not dependent on the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, in a case that the UE transitions to the deregistered state for the current PLMN via one access, or successfully registers with a new PLMN via one certain access, or fails to register with a new PLMN via one access and transitions to the deregistered state, and further that the UE is in a state of being deregistered (deregistered state) via the other access, then the UE deletes the first rejected NSSAI.

The second rejected NSSAI is a set of one or multiple S-NSSAIs unavailable in the current registration area among the S-NSSAIs that the UE includes in the requested NSSAI. The second rejected NSSAI may be Rejected NSSAI for the current registration area in the 5GS. The second rejected NSSAI may be a rejected NSSAI stored by the UE or the NW, or may be a rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The cause value in this case may be "S-NSSAI is not available in the current registration area," or may be information indicating that the S-NSSAI associated with the cause value is not available in the current registration area.

The second rejected NSSAI is valid in the current registration area. In other words, the UE and/or the NW may treat the second rejected NSSAI and the S-NSSAI included in the second rejected NSSAI as information for each access type. In other words, the second rejected NSSAI may be information valid for each of 3GPP access and non-3GPP access. In other words, once the UE transitions to the deregistered state for one access, the UE may delete the second rejected NSSAI from storage.

The third rejected NSSAI is a set of one or multiple S-NSSAIs that require NSSAA and for which NSSAA fails or is revoked. The third rejected NSSAI may be an NSSAI stored by the UE and/or the NW, or may be transmitted from the NW to the UE. In a case that the third rejected NSSAI is transmitted from the NW to the UE, the third rejected NSSAI may be information including one or multiple combinations of S-NSSAI and a reject cause value. The reject cause value in this case may be "S-NSSAI not available due to failure or revocation of NSSAA (S-NSSAI is not available due to the failed or revoked network slice-specific authorization and authentication)", and may be information indicating that NSSAA for the S-NSSAI associated with the reject cause value has failed or has been revoked.

The third rejected NSSAI is valid in the entire registered PLMN. In other words, the UE and/or the NW may treat the third rejected NSSAI and S-NSSAI included in the third rejected NSSAI as information not dependent on the access type. In other words, the third rejected NSSAI may be valid information for the 3GPP access and the non-3GPP access. The third rejected NSSAI may be NSSAI different from the rejected NSSAI. The third rejected NSSAI may be the first rejected NSSAI.

The third rejected NSSAI is a rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple S-NSSAIs received from the core network in association with the reject cause value indicating failure of NSSAA. The third rejected NSSAI is information not dependent on the access type. Specifically, in a case of storing the third rejected NSSAI, the UE need not attempt to transmit, either on the 3GPP access or on the non-3GPP access, the registration request message including the S-NSSAI included in the third rejected NSSAI. Alternatively, the UE can transmit the registration request message including the S-NSSAI included in the third rejected NSSAI, based on a UE policy.

Alternatively, the UE may delete the third rejected NSSAI based on the UE policy, and transition to a state in which the UE can transmit the registration request message including the S-NSSAI included in the third rejected NSSAI. In other words, in a case of transmitting, based on the UE policy, the registration request message including the S-NSSAI included in the third rejected NSSAI, the UE may delete the S-NSSAI from the third rejected NSSAI.

The pending NSSAI (also referred to as Pending NSSAI) is a set of one or multiple S-NSSAIs that require network slice specific authentication by the network, for which the network slice specific authentication has not completed yet, and that are not available in the current PLMN. The pending NSSAI may be a Rejected NSSAI due to NSSAA or a pending NSSAI of the 5GS. The pending NSSAI may be a NSSAI stored by the UE or the NW, and may be an NSSAI transmitted from the NW to the UE. Note that the pending NSSAI is not limited to the rejected NSSAI and may be an NSSAI independent of the rejected NSSAI. In a case that the pending NSSAI is NSSAI transmitted from the NW to the UE, the pending NSSAI may be information including one or multiple combinations of S-NSSAI and a reject cause value. The reject cause value in this case may be "S-NSSAI pending for NSSAA (NSSAA is pending for the S-NSSAI)", or may be information indicating that the UE is prohibited from or awaiting (pending) using the S-NSSAI associated with the reject cause value until NSSAA for the S-NSSAI completes.

The pending NSSAI is valid in the entire registered PLMN. In other words, the UE and/or the NW may treat the third rejected NSSAI and the S-NSSAI included in the pending NSSAI as information not dependent on the access type. In other words, the pending NSSAI may be information valid for the 3GPP access and the non-3GPP access. The pending NSSAI may be NSSAI different from the rejected NSSAI. The pending NSSAI may be first rejected NSSAI.

The pending NSSAI is the NSSAI including one or multiple S-NSSAIs allowing the UE to identify the slice in which the procedure is pending. Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is identification information including one or multiple S-NSSAIs received from the core network in association with the reject cause value indicating pending for NSSAA. The pending NSSAI is information not dependent on the access type. Specifically, in a case of storing the pending NSSAI, the UE attempts to transmit, neither on the 3GPP access nor on the non-3GPP access, the registration request message including the S-NSSAI included in the pending NSSAI.

A tracking area is a single or multiple ranges that can be expressed using the location information of the UE_10 managed by the core network. The tracking area may include multiple cells. In addition, the tracking area may be an area in which a control message such as paging is broadcast, or may be an area in which the UE_10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_10 may be able to move without transmitting and/or receiving a signal for updating the tracking area. In other words, the registration area may be an information group indicating an area in which the UE_10 can move without performing the tracking area update procedure. The registration area may be identified with a TAI list including one or multiple TAIs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Network Slice-Specific Authentication and Authorization (NSSAA) is a function for implementing authentication and authorization specific to a network slice. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Further, the UE having the NSSAA function can manage and store the rejected NSSAI for pending for NSSAA and/or the rejected NSSAI for failure of NSSAA. NSSAA may be herein referred to as a network slice specific authentication and authorization procedure or an authentication and authorization procedure.

The S-NSSAI that requires NSSAA is an S-NSSAI that requires NSSAA managed by the core network and/or the core network apparatus. The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NSSAI that requires NSSAA as information unrelated to the access network.

Now, description will be given of the identification information transmitted and/or received and stored and managed by apparatuses in the present embodiment.

First, 1st identification information is UE capability information. The 1st identification information may be 5GMM capability information. The 1st identification information may be information indicating whether the UE supports a certain function. The 1st identification information may indicate whether the UE supports handover between the SNPN and the PLMN.

2nd identification information is the Requested NSSAI. The 2nd identification information includes one or more requested S-NSSAIs. The 2nd identification information may indicate S-NSSAI that can be connected to the SNPN. The 2nd identification information may indicate S-NSSAI that can be connected to the PLMN via the SNPN.

3rd identification information is a type of requested registration. The 3rd identification information may be a 5GS registration type. The 3rd identification information may indicate initial registration, or mobility registration updating, or periodic registration updating, or emergency registration, or registration with the PLMN via the SNPN.

4th identification information is identification information including at least two of the 1st to 3rd identification information.

11th identification information is network capability information. The 11th identification information may be 5GS Network feature support. The 11th identification information may be information indicating whether the network supports a certain function. The 11th identification information may indicate whether the network supports the handover between the SNPN and the PLMN.

12th identification information is the Allowed NSSAI. The 12th identification information may include one or multiple S-NSSAIs.

13th identification information is the Rejected NSSAI. The 13th identification information may include one or multiple S-NSSAIs.

14th identification information is the Configured NSSAI. The 14th identification information may include one or multiple S-NSSAIs.

15th identification information is the Pending NSSAI. The 15th identification information may include one or multiple S-NSSAIs.

16th identification information is identification information including at least two of the 11th to 15th identification information.

21st identification information may be a PDU session ID for identifying a PDU session. The 21st identification information may be a PDU session ID for identifying a PDU session requested to be established.

22nd identification information may be a PDU session type for identifying the type of the PDU session. The 22nd identification information may be a PDU session type requested for the PDU session by the UE. The 22nd identification information may indicate one of IPv4, IPv6, IPv4v6, Unstructured, and Ethernet (trade name).

23nd identification information is the SSC mode. The 23nd identification information may be the SSC mode requested for the PDU session by the UE. The 23nd identification information may indicate one of SSC mode 1, SSC mode 2, and SSC mode 3.

24th identification information is UE capability information. The 24th identification information may be 5GSM capability. The 24th identification information may indicate whether the UE supports a certain function. The 24th identification information may indicate whether the UE supports a function to establish a PDU session for the PLMN via the SNPN, or may indicate whether the UE supports the handover between the SNPN and the PLMN.

25th identification information includes one or more S-NSSAIs. The 25th identification information may include one or more S-NSSAIs requested by the UE for the PDU session to be established. The 25th identification information may include one or more S-NSSAIs selected from among the Allowed NSSAI for the current access type. Specifically, the 25th identification information may include one or more S-NSSAIs for at least one of the accesses (3GPP access or non-3GPP access) allowed by the network as Allowed NSSAI included in a Registration Accept message in the Registration procedure.

26th identification information is the DNN. The 26th identification information may be a DNN for identifying the DN corresponding to the connection destination of the PDU session requested by the UE to be established.

27th identification information may be a PDU session ID for identifying a PDU session. The 27th identification information may be a PDU session ID for identifying a PDU session requested to be established. For example, the 27th identification information may be a PDU session ID for identifying a PDU session using 3GPP access in a case that the PDU session using the 3GPP access is already established. The 27th identification information may be a PDU session ID for identifying a PDU session via a non-3GPP access in a case that the PDU session using the non-3GPP access is already established. The 27th identification information may be a PDU session ID for identifying a PDU session established in the SNPN, or may be a PDU session ID for identifying a PDU session established in the PLMN, or may be a PDU session ID for identifying a PDU session established in the PLMN via the SNPN.

28th identification information is identification information including at least two of the 21st to 27th identification information.

31st identification information is a PDU session ID for identifying a PDU session. The 31st identification information may be a PDU session ID for identifying a PDU session allowed to be established by the network.

32nd identification information may be a PDU session type for identifying the type of the PDU session. The 32nd identification information may be the PDU session type selected by the network. The 32nd identification information may indicate one of IPv4, IPv6, IPv4v6, Unstructured, and Ethernet (trade name).

33rd identification information is the SSC mode. The 33rd identification information may be the SSC mode selected for the PDU session by the network. The 33rd identification information may indicate one of SSC mode 1, SSC mode 2, and SSC mode 3.

34th identification information is network UE capability information. The 34th identification information may be 5GSM network feature support. The 34th identification information may indicate whether the network supports a certain function. The 34th identification information may indicate whether the network supports the function to establish a PDU session for the PLMN via the SNPN, or may indicate whether the network supports the handover between the SNPN and the PLMN.

35th identification information includes one or more S-NSSAIs.

36th identification information is the DNN. The 36th identification information may be a DNN for identifying the DN corresponding to the connection destination of the PDU session.

37th identification information is identification information including at least two of the 31st to 36th identification information.

41st identification information is the type of de-registration. The 41st identification information may be the De-registration type. The 41st identification information may indicate whether re-registration is required. The 41st identification information may indicate, in connection with whether re-registration is required, whether the re-registration for the 3GPP access, for the non-3GPP access, or for the 3GPP access and non-3GPP access. Note that the 41st identification information, indicating a re-registration request, may indicate that change from the PLMN to the SNPN is required, may indicate that redirection to the PLMN via the SNPN is required, or may indicate that the PLMN is not available, or may indicate that direct access to the PLMN is not available, or may indicate that the PLMN is not allowed, or may indicate that direct access to the PLMN is not allowed, or may indicate that access to the PLMN via the SNPN is allowed, or may indicate deactivation of the SNPN access mode.

The 41st identification information, indicating a re-registration request, may indicate that change from the SNPN to the PLMN is required, may indicate that redirection to the PLMN is required, or may indicate that the PLMN via the SNPN is not available, or may indicate that access to the PLMN via the SNPN is not available, or may indicate that access to the PLMN via the SNPN is not allowed, or may indicate that direct access to the PLMN is allowed, or may indicate activation of the SNPN access mode.

42nd identification information is a cause value. The 42nd identification information may be a 5GMM cause. The 42nd identification information may indicate that change from the PLMN to the SNPN is required, may indicate that redirection to the PLMN via the SNPN is required, or may indicate that the PLMN is not available, or may indicate that direct access to the PLMN is not available, or may indicate that the PLMN is not allowed, or may indicate that direct access to the PLMN is not allowed, or may indicate that access to the PLMN via the SNPN is allowed, or may indicate deactivation of the SNPN access mode.

The 42nd identification information may indicate that change from the SNPN to the PLMN is required, may indicate that redirection to the PLMN is required, or may indicate that access to the PLMN via the SNPN is not available, or may indicate that the PLMN via the SNPN is not available, or may indicate that the access to the PLMN via the SNPN is not allowed, or may indicate that direct access to the PLMN is allowed, or may indicate activation of the SNPN access mode.

43rd identification information is identification information including at least two of the 41st and 42nd identification information.

51st identification information is the type of de-registration. The 51st identification information may be the De-registration type. The 51st identification information may indicate whether the de-registration is normal de-registration or switch-off. In connection with whether the de-registration is normal de-registration or switch-off, the 51st identification information may indicate whether the de-registration is for the 3GPP access, or for the non-3GPP access, or for the 3GPP access and non-3GPP access.

52nd identification information is a cause value. The 52nd identification information may be the 5GMM cause. The 52nd identification information may indicate that change from the PLMN to the SNPN is required, may indicate that redirection to the PLMN via the SNPN is required, or may indicate that the PLMN is not available, or may indicate that direct access to the PLMN is not available, or may indicate that the PLMN is not allowed, or may indicate that direct access to the PLMN is not allowed, or may indicate that access to the PLMN via the SNPN is allowed, or may indicate deactivation of the SNPN access mode.

The 52nd identification information may indicate that change from the SNPN to the PLMN is required, may indicate that redirection to the PLMN is required, or may indicate that access to the PLMN via the SNPN is not available, or may indicate that the PLMN via the SNPN is not available, or may indicate that the access to the PLMN via the SNPN is not allowed, or may indicate that direct access to the PLMN is allowed, or may indicate activation of the SNPN access mode.

The 53rd identification information is identification information including at least two of the 51st and 52nd identification information.

62nd identification information is a cause value. The 62nd identification information may be the 5GMM cause. The 62nd identification information may indicate that change from the PLMN to the SNPN is required, may indicate that redirection to the PLMN via the SNPN is required, or may indicate that the PLMN is not available, or may indicate that direct access to the PLMN is not available, or may indicate that the PLMN is not allowed, or may indicate that direct access to the PLMN is not allowed, or may indicate that access to the PLMN via the SNPN is allowed, or may indicate deactivation of the SNPN access mode.

The 62nd identification information may indicate that change from the SNPN to the PLMN is required, may indicate that redirection to the PLMN is required, or may indicate that access to the PLMN via the SNPN is not available, or may indicate that the PLMN via the SNPN is not available, or may indicate that the access to the PLMN via the SNPN is not allowed, or may indicate that direct access to the PLMN is allowed, or may indicate activation of the SNPN access mode.

71st identification information may be a PDU session ID for identifying a PDU session. The 71st identification information may be a PDU session ID for identifying a PDU session indicated to be released.

72nd identification information is a cause value. The 72nd identification information may be the 5GSM cause. The 72nd identification information may indicate that change from the PLMN to the SNPN is required, may indicate that redirection to the PLMN via the SNPN is required, or may indicate that the PLMN is not available, or may indicate that direct access to the PLMN is not available, or may indicate that the PLMN is not allowed, or may indicate that direct access to the PLMN is not allowed, or may indicate that access to the PLMN via the SNPN is allowed, or may indicate deactivation of the SNPN access mode.

The 72nd identification information may indicate that change from the SNPN to the PLMN is required, may indicate that redirection to the PLMN is required, or may indicate that access to the PLMN via the SNPN is not available, or may indicate that the PLMN via the SNPN is not available, or may indicate that the access to the PLMN via the SNPN is not allowed, or may indicate that direct access to the PLMN is allowed, or may indicate activation of the SNPN access mode.

73rd identification information is an access type. The 73rd identification information may indicate the 3GPP access and/or the non-3GPP access.

In a case that a first PDU session for the PLMN is established using the 3GPP access, and the first PDU session is to be released, the 3GPP access may be indicated as the 73rd identification information.

In a case that a second PDU session for the SNPN is established using the 3GPP access, further a third PDU session for the PLMN is also established using the non-3GPP access using the second PDU session (via the SNPN), and only the third PDU session is to be released, the non-3GPP access may be indicated as the 73rd identification information.

In a case that the second PDU session for the SNPN is established using the 3GPP access, further the third PDU session for the PLMN is also established via the SNPN (in other words, via the established PDU session), and the second PDU session and the third PDU session are to be released, the 3GPP access and the non-3GPP access may be indicated as the 73rd identification information.

In a case that the second PDU session for the SNPN is established using the 3GPP access, and the second PDU session is to be released, the 3GPP access may be indicated as the 73rd identification information.

74th identification information may be a PDU session ID for identifying a PDU session. The 74th identification information may be a PDU session ID for identifying an already established PDU session. For example, the 74th identification information may be a PDU session ID for identifying a PDU session established in the PLMN, or may be a PDU session ID for identifying a PDU session established in the SNPN, or may be a PDU session ID for identifying a PDU session established in the PLMN via the SNPN.

75th identification information is identification information including at least two of the 71st to 74th identification information.

81st identification information may be a PDU session ID for identifying a PDU session. The 81st identification information may be a PDU session ID for identifying a PDU session requested to be established.

3. First Embodiment

In the present embodiment, in the PLMN, the UE performs a Registration procedure in Section 3.1, and performs a PDU session establishment procedure in Section 3.2 to establish a first PDU session. Then, in the PLMN, the UE may or may not perform a De-registration procedure in Section 3.3 or a PDU session release procedure in Section 3.4. In the SNPN, the UE performs a registration procedure in Section 3.5, and performs a PDU session establishment procedure in Section 3.6 to establish a second PDU session. Furthermore, on the PLMN via the established second PDU session (in other words, via the SNPN), the UE performs the registration procedure in Section 3.7, and performs a PDU session establishment procedure in Section 3.8 to establish a third PDU session. By performing these procedures, the UE can transfer the first PDU session to the third PDU session.

3.1. Registration Procedure for PLMN

Now, the Registration procedure in the PLMN will be described by using FIGS. 1, 2, and 8. Here, a case is described below in which the registration procedure in the PLMN is performed using the 3GPP access. In this case the registration procedure in the PLMN may be performed by the UE in the first state or the third state or the fourth state. Note that the registration procedure in the PLMN may be performed using the non-3GPP access and that in this case, the registration procedure in the PLMN may be performed by the UE in the first state or the third state or the fifth state. Hereinafter, the registration procedure in the PLMN is also referred to as the registration procedure or the present procedure. The registration procedure is a procedure initiated by the UE to register with the access network_100 (hereinafter also referred to as the access network), and/or the core network_200 (hereinafter also referred to as the core network), and/or the DN_250 (hereinafter also referred to as the DN). In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. In addition, the UE may initiate the registration procedure, based on completion of the registration procedure, or completion of the PDU session establishment procedure, or information received from the network in each procedure. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

First, the UE initiates the registration procedure by transmitting a Registration request message to the AMF_210 (hereinafter also referred to as the AMF) using 3GPP access (access network_100) (S600), (S602), and (S604). Here, the 3GPP access may include the base station apparatus_110 (hereinafter also referred to as the base station apparatus). Specifically, the UE transmits, to the base station apparatus (hereinafter also referred to as the gNB), an RRC message including the Registration request message (S600). Note that the registration request message is a NAS message transmitted and/or received over the N1 interface. The RRC message may be a control message transmitted and/or received between the UE and the base station apparatus. The NAS message is processed in the NAS layer, and the RRC message is processed in the RRC layer, which is lower than the NAS layer.

Here, the UE can include at least one piece of identification information out of the 1st to 4th identification information in the registration request message and/or the RRC message for transmission.

The UE may include at least one of these pieces of identification information in a control message different from the control messages described above, for example, a control message of a lower layer than the RRC layer (for example, a Medium Access Control (MAC) layer, a Radio Link Control (RLC) layer, a Packet Data Convergence Protocol (PDCP) layer, a Service Data Adaptation Protocol (SDAP) layer, or the like), and may transmit the control message. Note that, by transmitting these pieces of identification information, the UE may indicate that the UE supports each function, may indicate a request of the UE, or may indicate both of these.

Note that the UE may select or determine whether to transmit at least one of these pieces of identification information based on the UE capability information, and/or the UE policy, and/or the UE state, and/or the user registration information, and/or a context stored in the UE, and/or the like.

The UE may include information other than the identification information described above in the registration request message and/or the RRC message, and may include, for example, the UE ID and/or the PLMN ID and/or the AMF identification information in the message for transmission. Here, the AMF identification information may be information for identifying an AMF or a set of AMFs, and may be, for example, a 5G S-Temporary Mobile Subscription Identifier (5G-S-TMSI) or a Globally Unique AMF Identifier (GUAMI).

In a case of receiving the RRC message including the registration request message, the base station apparatus selects the AMF to transfer the registration request message (S602). Note that the base station apparatus can select the AMF based on a received message and/or information. Note that the base station apparatus may select the AMF based on other conditions.

The base station apparatus extracts the registration request message from the received RRC message and transfers the registration request message to the selected AMF (S604). Note that in a case that at least one piece of identification information out of the 1st to 4th identification information is not included in the registration request message but in the RRC message, the identification information included in the RRC message may be transferred to the selected AMF together with the registration request message (S604).

In a case of receiving the registration request message, the AMF can perform the 1st condition fulfillment determination. The 1st condition fulfillment determination is intended to determine whether the network accepts a request of the UE. In a case that the 1st condition fulfillment determination is true, the AMF may perform steps S610 to S612 of the procedure. In a case that the first condition fulfillment determination is false, the AMF may perform step S610 of the procedure.

The first condition fulfillment determination may be performed by a network function (also referred to as an NF) other than the AMF. The NF may be, for example, a Network Slice Selection Function (NSSF), a Network Data Analytics Function (NWDAF), a Policy Control Function (PCF), or the like. In a case that the NF other than the AMF performs the first condition fulfillment determination, the AMF may provide the NF with at least a part of information necessary for performing the first condition fulfillment determination, specifically, information received from the UE. Then, in a case that the NF determines true or false of the first condition fulfillment determination based on the information received from the AMF, the NF may notify the AMF of information including results (in other words, true or false) of the first condition fulfillment determination. The AMF may determine the identification information and/or the control message to be transmitted to the UE, based on the result of the first condition fulfillment determination received from the NF.

Note that in a case that the first condition fulfillment determination is true, the control message transmitted and/or received in S610 may be the Registration accept message. In a case that the first condition fulfillment determination is false, the control message transmitted and/or received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, in a case that the network allows the request of the UE, the first condition fulfillment determination may be true, whereas in a case that the network does not allow the request of the UE, the first condition fulfillment determination may be false. In a case that a network with which the UE is registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false.

Here, assuming that the first condition fulfillment determination is true, the description is continued.

The AMF may include one or more pieces of identification information out of the 11th to the 16th identification information in the control message for transmission. The 11th identification information may be information transmitted only in a case that the 1st identification information is received or may be information transmitted even in a case that the 1st identification information is not received. Note that, by transmitting these pieces of identification information and/or the control message, the AMF may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF is scheduled to perform the NSSAA procedure after completion of the present procedure or in parallel with the present procedure although there is no S-NSSAI (allowed NSSAI) allowed for the UE at the time of transmission of the control message (registration accept message), or the AMF is in the middle of performing the NSSAA procedure between the UE and the network, or the AMF includes the pending NSSAI in the control message for transmission, then the AMF may include an empty value in the allowed NSSAI for transmission.

Note that the AMF may determine at least which piece of identification information out of the 11th to the 16th identification information is to be included in the control message, based on each piece of received identification information, and/or subscriber information, and/or the network capability information, and/or the operator policy, and/or the network state, and/or the user registration information, and/or the context stored in the AMF, and/or the like.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

The UE receives the control message (registration accept message) via the base station apparatus (S610). By receiving the registration accept message, the UE can recognize that the request from the UE on the registration request message is accepted, and recognize details of various pieces of identification information included in the registration accept message.

The UE can further transmit a registration complete message to the AMF via the base station apparatus as a response message to the registration accept message (S612). Here, the registration complete message is a NAS message transmitted and/or received on the N1 interface; however, the registration complete message may be included in an RRC message for transmission and/or reception between the UE and the base station apparatus.

The AMF receives the registration complete message via the base station apparatus (S612). Each apparatus completes the present procedure based on transmission and/or reception of the registration accept message and/or the registration complete message.

Note that each apparatus may transition to or maintain a state in which the UE is registered with the network (RM-_REGISTERED state or 5GMM-REGISTERED state) based on the transmission and/or reception of the registration accept message and/or the registration complete message or completion of the registration procedure.

Each apparatus may store pieces of information received in the present procedure in association with one another.

Even after completing the present procedure, the UE may be in the first state or the third state or the fourth state.

Note that in a case that the present procedure is performed using the non-3GPP access, the UE may be in the first state or the third state or the fifth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

3.2. PDU Session Establishment Procedure for PLMN

Figure 9:
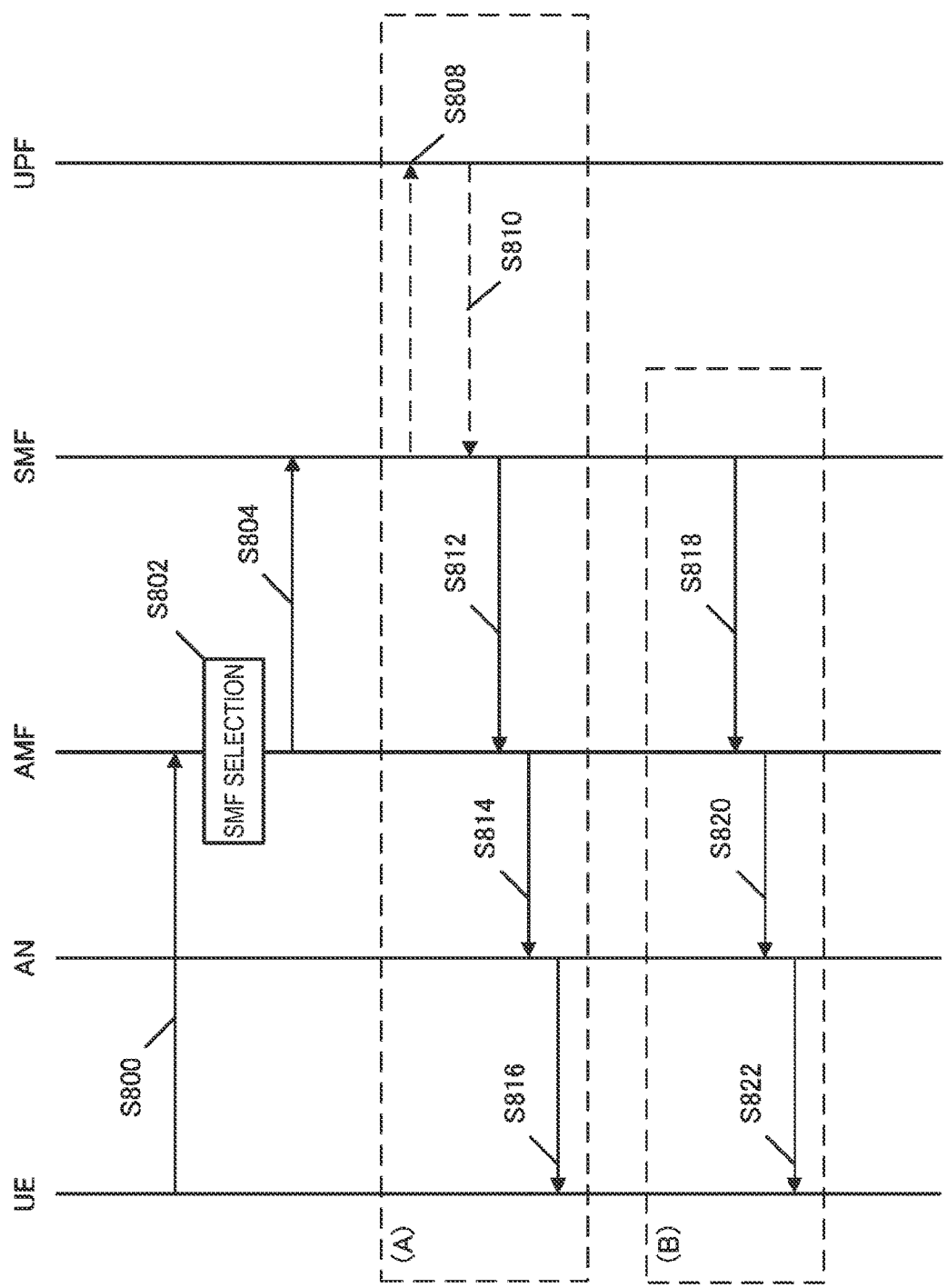
FIG. 9 is a diagram illustrating a PDU session establishment procedure.

Now, with reference to FIGS. 1, 2, and 9, the PDU session establishment procedure will be described, which is performed by the UE to establish a PDU session in the PLMN after performing the registration procedure in Section 3.1 once or more than once. Here, a case is described below in which the PDU session establishment procedure is performed via the same access (in other words, 3GPP access) as an access for which the registration procedure in Section 3.1 is performed. In this case, the PDU session establishment procedure may be performed by the UE in the first state or the third state or the fourth state. Note that in a case that the registration procedure of the Section 3.1 is performed using the non-3GPP access, the UE in the first state or the third state or the fifth state may perform the PDU session establishment procedure using the non-3GPP access. The PDU session establishment procedure in the PLMN is hereinafter also referred to as the PDU session establishment procedure or the present procedure.

First, by transmitting a NAS message including an N1 SM container including the PDU session establishment request message to the AMF_210 (hereinafter also referred to as the AMF) using the 3GPP access (access network_100) (S800), the UE initiates the PDU session establishment procedure. Here, the 3GPP access may include the base station apparatus_110 (hereinafter also referred to as the base station apparatus). In other words, the UE transmits the NAS message to the AMF via the base station apparatus. The NAS message may be, for example, a message transmitted via the N1 interface, and may be an uplink NAS transport (UL NAS TRANSPORT) message.

The UE can notify the network side of what is requested by the UE by including at least one piece of identification information out of the 21st to 26th identification information and the 28th identification information in the PDU session establishment request message, and/or the N1 SM container, and/or the NAS message for transmission. Here, the 21st identification information is intended to indicate PDU session ID #1 that identifies the first PDU session. The 23rd identification information may indicate SSC mode 1, or indicate SSC mode 2, or indicate SSC mode 3, but is assumed here to indicate SSC mode 2.

Note that the UE may determine which of 21st to 26th identification information and the 28th identification information is transmitted to the network or not based on the UE capability information, and/or the UE policy, and/or the UE state, and/or the user registration information, and/or the context stored in the UE, and/or the like.

Note that the UE may include these pieces of identification information in a control message different from the control messages described above, for example, a control message from a lower layer than the NAS layer (for example, the RRC layer, the MAC layer, the RLC layer, the PDCP layer, the SDAP layer, or the like) or a control message from a higher layer than the NAS layer (for example, a transport layer, a session layer, a presentation layer, an application layer, or the like), and may transmit the control message.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like. Here, it is assumed that the SMF_220 (hereinafter also referred to as the SMF) is selected.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. A second condition fulfillment determination may be intended to determine whether the network accepts a request of the UE. In a case that the second condition fulfillment determination is true, the SMF may initiate the procedure in (A) of FIG. 9, whereas in a case that the second condition fulfillment determination is false, the SMF may initiate the procedure in (B) of FIG. 9.

Note that the second condition fulfillment determination may be performed by the NF other than the SMF. The NF may be, for example, NSSF, NWDAF, PCF, or NRF. In a case that the NF other than the SMF performs the second condition fulfillment determination, the SMF may provide the NF with at least a part of information necessary for performing the second condition fulfillment determination, specifically, information received from the UE (S806). Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the result of the second condition fulfillment determination received from the NF.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be true, whereas in a case that the network does not allow the request of the UE, the second condition fulfillment determination may be false. In a case that a network as a connection destination of the UE and/or an apparatus in the network supports the function requested by the UE, the second condition fulfillment determination may be true, whereas in a case that the network and/or the apparatus does not support the function requested by the UE, the second condition fulfillment determination may be false. In a case that the transmitted and/or received identification information is allowed, the second condition fulfillment determination may be true, whereas in a case that the transmitted and/or received identification information is not allowed, the second condition fulfillment determination may be false. Note that the condition for determining true or false of the second condition fulfillment determination need not necessarily be limited to the condition described above.

Now, each step of the procedure in (A) of FIG. 9 will be described.

Next, the SMF may select the UPF for a PDU session to be established, and may transmit the N4 session establishment request message to the selected UPF via the N4 interface, for example (S808). The N4 session establishment request message may include at least a portion of the PCC rule received from the PCF.

Here, the SMF may select one or more UPFs, based on the information and the like (a message, a container, information) received from the AMF, and/or the information received from the PCF such as the PCC rule, and/or the subscriber information, and/or the network capability information, and/or the UE policy, and/or the operator policy, and/or the network state, and/or the user registration information, and/or the context stored in the SMF, and/or the like.

In a case that multiple UPFs are selected, the SMF may transmit the N4 session establishment request message to each UPF. The description below assumes that UPF_230 (hereinafter referred to as the UPF) is selected.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Then, the AMF that receives the N1 SM container, and/or the N2 SM information, and/or the PDU session ID transmits the NAS message to the UE via the base station apparatus included in the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the base station apparatus included in the access network (S814), the base station apparatus receives the N2 PDU session request message and transmits the NAS message to the UE (S816). Here, the N2 PDU session request message may include the NAS message and/or the N2 SM information. The NAS message may include the PDU session ID and/or the N1 SM container.

The PDU session establishment accept message may be a response message to the PDU session establishment request. The PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message has been accepted.

Here, the SMF and/or the AMF may include at least one piece of identification information out of the 31st to 37th identification information in the PDU session establishment accept message, and/or the N1 SM container, and/or the NAS message, and/or the N2 SM information, and/or the N2 PDU session request message for transmission. In this regard, the 31st identification information may be identical to the 21st identification information in the present procedure. The 32nd identification information may be identical to or different from the 22nd identification information in the present procedure. The 33rd identification information may be identical to or different from the 23rd identification information in the present procedure, but here, it is assumed that the 33rd identification information indicates SSC mode 2. The 35th identification information may be identical to the 25th identification information in the present procedure. The 36th identification information may be identical to the 26th identification information in the present procedure. The 34th identification information may be information transmitted only in a case that the 24th identification information is received or may be information transmitted even in a case that the 24th identification information is not received.

Note that, by transmitting these pieces of identification information and/or the PDU session establishment accept message, the SMF may indicate that the network supports each function, may indicate that the request of the UE has been accepted, may indicate that the request from the UE is not allowed, or may indicate information of a combination of these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting at least one of these pieces of identification information, the SMF and/or the AMF can notify the UE of details of these pieces of identification information.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the network capability information, and/or the UE policy, and/or the operator policy, and/or the network state, and/or the user registration information, and/or the context stored in the SMF and/or the AMF, and/or the like.

Next, in a case that the UE receives the NAS message via the N1 interface, for example (S816), the UE can recognize that the request of the UE by the PDU session establishment request message has been accepted, and/or details of the information and the like (a message, a container, information) included in the NAS message. For example, based on the received 31st, 32nd, and 33rd identification information, the UE may recognize the PDU session type and the SSC mode configured for the PDU session identified by the 31st identification information. The UE may recognize functions supported by the network based on the received 34th identification information.

Now, each step of the procedure in (B) of FIG. 9 will be described.

First, based on reception of the PDU session establishment request message, the SMF transmits the N1 SM container and/or the PDU session ID to the AMF, for example, via the N11 interface (S818). Here, the N1 SM container may include the PDU session establishment reject message.

Then, in a case of receiving the N1 SM container and/or the PDU session ID, the AMF transmits the NAS message to the UE via a first base station apparatus included in the access network (S820) (S822). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message to the PDU session establishment request. The PDU session establishment reject message may indicate that establishment of the PDU session has been rejected.

Here, by transmitting the PDU session establishment reject message, and/or the N1 SM container, and/or the PDU session ID, and/or the NAS message, the SMF and/or the AMF may indicate that the request of the UE by the PDU session establishment request message has been rejected.

Note that, by transmitting the PDU session establishment reject message, the SMF may indicate that the network does not support each function, may indicate that the request of the UE has been rejected, may indicate that the request from the UE is not allowed, or may indicate a combination of the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting at least one of these pieces of identification information, the SMF and/or the AMF can notify the UE of details of these pieces of identification information.

Then, in a case of receiving the NAS message via the N1 interface, for example (S822), the UE can recognize that the request of the UE by the PDU session establishment request message has been rejected, and/or details of the information and the like (a message, a container, information) included in the NAS message.

Each apparatus may complete the present procedure, based on transmission and/or reception of the PDU session establishment accept message. At this time, each apparatus may transition to a state in which the apparatus can communicating with the DN using the established PDU session.

Each apparatus may complete the present procedure based on transmission and/or reception of the PDU session establishment reject message. At this time, each apparatus fails to establish a PDU session, and thus the apparatus fails to communicate with the DN in a case that no PDU session has been established.

Note that each type of processing performed by the UE based on reception of each piece of identification information described above may be performed during the present procedure or after completion of the present procedure or may be performed based on completion of the present procedure after completion of the present procedure.

Each apparatus may store pieces of information received in the present procedure in association with one another.

Even after completing the present procedure, the UE may be in the first state or the third state or the fourth state.

Note that in a case that the present procedure is performed using the non-3GPP access, the UE may be in the first state or the third state or the fifth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The description below assumes that the PDU session establishment accept message is received and that the PDU session in the PLMN (first PDU session identified by the PDU session ID #1) is established. The UE in these states may or may not perform a procedure in Section 3.3 or Section 3.4 after completion of the present procedure. The UE in these states may perform a procedure in Section 3.5 without performing the procedure in Section 3.3 or 3.4 after completion of the present procedure.

3.3. De-Registration Procedure in PLMN

Now, the de-registration procedure in the PLMN will be described. Here, in the description below, the de-registration procedure in the PLMN is performed via the same access (i.e., 3GPP access) as an access for which the procedure in Section 3.1 or 3.2 is performed. In this case, the de-registration procedure in the PLMN may be performed by the UE in the first state or the third state or the fourth state. Note that, in a case that the procedure in Section 3.1 or 3.2 is performed using the non-3GPP access, and the de-registration procedure in the PLMN is performed using the non-3GPP access, the de-registration procedure in PLMN may be performed by the UE in the first state or the third state or the fifth state. Hereinafter, the de-registration procedure in the PLMN is also referred to as the de-registration procedure or the present procedure. The de-registration procedure includes a network-initiated de-registration procedure and a UE-initiated de-registration procedure. The de-registration procedure may be a procedure for canceling registration of the UE registered with the network (the access network, and/or the core network, and/or the DN). In other words, the UE or the AMF may perform the de-registration procedure in a case that the UE is registered with the network (RM-REGISTERED state or 5GMM-REGISTERED state). In a case of detecting that the UE has exited the area where the UE can communicate with the PLMN and/or has entered the area where the UE can communicate with the SNPN, or the like, each apparatus may perform the de-registration procedure. In particular, in a case that a PDU session configured with SSC mode 2 is established, the present procedure may be performed.

3.3.1 Network-Initiated De-Registration Procedure

Figure 10:
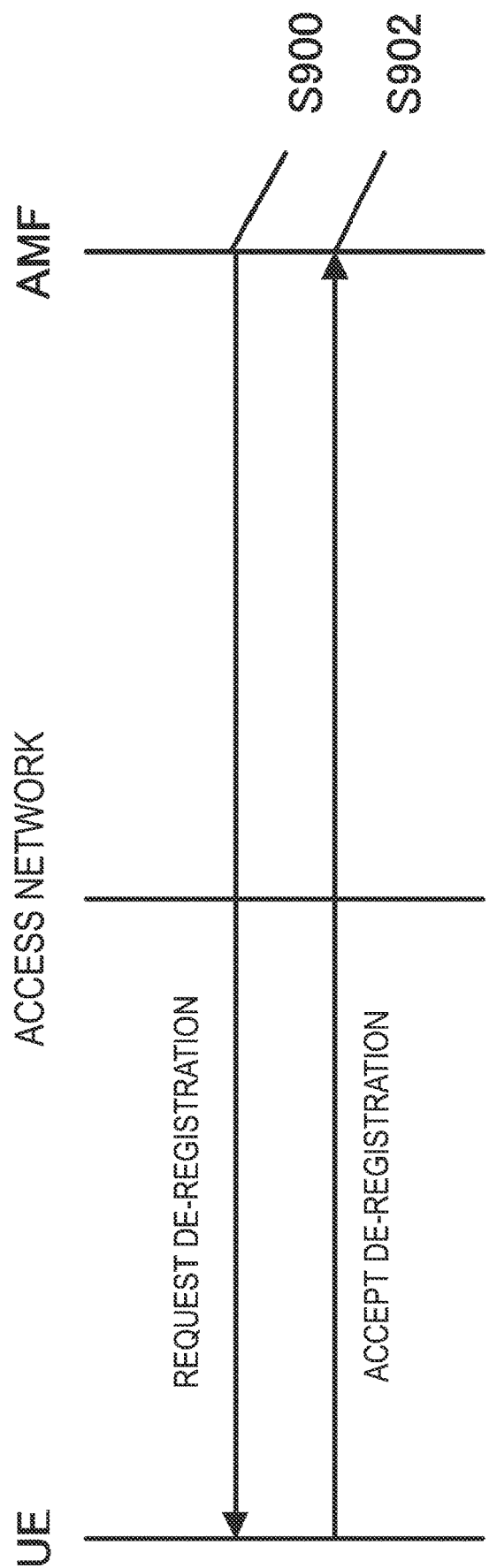
FIG. 10 is a diagram illustrating a network-initiated de-registration procedure.

First, the network-initiated de-registration procedure will be described by using FIGS. 1, 2, and 10. Hereinafter, the network-initiated de-registration procedure in the PLMN is also referred to as the de-registration procedure or the present procedure.

The AMF_210 (hereinafter also referred to as the AMF) may initiate the present procedure by transmitting a de-registration request (DEREGISTRATION REQUEST) message to the UE using the 3GPP access (access network_100) (S900). Here, the de-registration request message is a NAS message transmitted and/or received on the N1 interface, but is actually a message transmitted by the AMF to the UE via the base station apparatus_110 (hereinafter also referred to as the base station apparatus) included in the access network_100.

The AMF may include at least one piece of identification information out of the 41st to 43rd identification information in the de-registration request message for transmission. Note that which of the 41st to 43rd identification information is included in the de-registration request message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN the AMF may include at least one piece of identification information out of the 41st to 43rd identification information in the de-registration request message for transmission.

By transmitting at least one of these pieces of identification information and/or the de-registration request message, the AMF may request transitioning of the registered state of the UE in the PLMN to the deregistered state, and/or may request release of the PDU session established in the PLMN, and/or may indicate initiation of the registration procedure and/or the PDU session establishment procedure for the SNPN, and/or may indicate initiation of the registration procedure and/or the PDU session establishment procedure for the PLMN via the SNPN, and/or may indicate change from direct connection to the PLMN to connection to the PLMN via the SNPN, and/or may indicate change from a PDU session directly established for the PLMN to a PDU session established for the PLMN via the SNPN, and/or may indicate activation of the SNPN access mode, and/or may indicate operation in the SNPN access mode.

In a case of receiving the de-registration request message from the AMF, the UE can recognize the contents of each piece of identification information included in the de-registration request message. The UE may then determine the behavior of the UE based on the reception of the de-registration request message, and/or each piece of identification information.

In other words, the UE may transition the registered state of the UE in the PLMN to the deregistered state, or may release the PDU session established in the PLMN, or may initiate the registration procedure and/or the PDU session establishment procedure for the SNPN, or may initiate the registration procedure and/or the PDU session establishment procedure for the PLMN via the SNPN, or may perform processing for changing from direct connection to the PLMN to connection to the PLMN via the SNPN, or may activate the SNPN access mode, or may configure operation in the SNPN access mode. These may be performed while the present procedure is being performed, or may be performed after completion of the present procedure.

In a case of receiving the de-registration request message, the UE may transmit the de-registration accept message (DEREGISTRATION ACCEPT) message to the AMF (S902). Here, the de-registration accept message is a NAS message transmitted and/or received on the N1 interface, but is actually a message transmitted by the UE to the AMF via the access network.

Each apparatus may transition to a state in which the UE is not registered with the network (RM_DEREGISTERED state or 5GMM-DEREGISTERED state) based on the transmission and/or reception of the de-registration accept message. The state transition of each apparatus may be performed based on the completion of the present procedure.

Each apparatus may store pieces of information received in the present procedure in association with one another.

After completing the present procedure, the UE may be in the second state or the fourth state or the fifth state or the sixth state.

Note that in a case that the present procedure is performed using the non-3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 3.5.

3.3.2 UE-Initiated De-Registration Procedure

Figure 11:
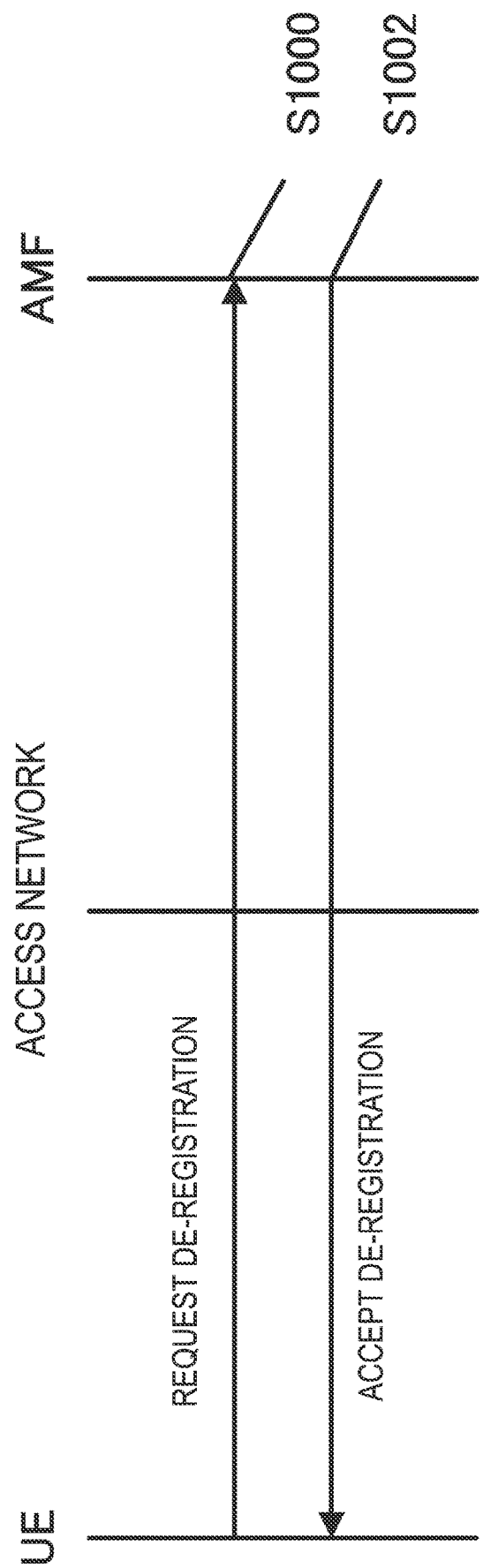
FIG. 11 is a diagram illustrating a UE-initiated de-registration procedure.

Now, the UE-initiated de-registration procedure will be described by using FIGS. 1, 2, and 11. Hereinafter, the UE-initiated de-registration procedure in the PLMN is also referred to as the de-registration procedure or the present procedure. The UE initiates the present procedure by transmitting a de-registration request (DEREGISTRATION REQUEST) message to the AMF_210 (hereinafter also referred to as the AMF) using the 3GPP access (access network_100) (S1000). Here, the de-registration request message is a NAS message transmitted and/or received on the N1 interface, but is actually a message transmitted by the UE to the AMF via the base station apparatus_110 (hereinafter also referred to as the base station apparatus) included in the access network_100.

The UE may include at least one piece of identification information out of the 51st to the 53rd identification information in the de-registration request message for transmission. Note that which of the 51st to 53rd identification information is included in the de-registration request message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the UE may include at least one piece of identification information out of the 51st to 53rd identification information in the de-registration request message for transmission.

In a case of receiving the de-registration request message from the UE, the AMF may determine the behavior of the AMF based on the reception of the de-registration request message and/or identification information.

For example, the AMF that receives the de-registration request message may transmit the de-registration accept message (DEREGISTRATION ACCEPT message) to the UE (S1002). Here, the de-registration accept message is a NAS message transmitted and/or received on the N1 interface, but is actually a message transmitted by the AMF to the UE via the access network.

The AMF may include 62nd identification information in the de-registration accept message for transmission. Note that whether to include the 62nd identification information in the de-registration accept message may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the AMF may include the 62nd identification information in the de-registration accept message for transmission.

By transmitting at least one of these pieces of identification information and/or the de-registration accept message, the AMF may request transitioning of the registered state of the UE in the PLMN to the deregistered state, and/or may request release of the PDU session established in the PLMN, and/or may indicate initiation of the registration procedure and/or the PDU session establishment procedure for the SNPN, and/or may indicate initiation of the registration procedure and/or the PDU session establishment procedure for the PLMN via the SNPN, and/or may indicate change from direct connection to the PLMN to connection to the PLMN via the SNPN, and/or may indicate change from a PDU session directly established for the PLMN to a PDU session established for the PLMN via the SNPN, and/or may indicate activation of the SNPN access mode, and/or may indicate operation in the SNPN access mode.

In a case of receiving the de-registration accept message from the AMF, the UE can recognize the contents of each piece of identification information included in the de-registration accept message. The UE may then determine the behavior of the UE based on the reception of the de-registration accept message and/or each piece of identification information.

In other words, the UE may transition the registered state of the UE in the PLMN to the deregistered state, or may release the PDU session established in the PLMN, or may initiate the registration procedure and/or the PDU session establishment procedure for the SNPN, or may initiate the registration procedure and/or the PDU session establishment procedure for the PLMN via the SNPN, or may perform processing for changing from direct connection to the PLMN to connection to the PLMN via the SNPN, or may activate the SNPN access mode, or may configure operation in the SNPN access mode. These may be performed while the present procedure is being performed, or may be performed after completion of the present procedure.

Each apparatus may transition to a state in which the UE is not registered with the network (RM_DEREGISTERED state or 5GMM-DEREGISTERED state) based on the transmission and/or reception of the de-registration accept message. The state transition of each apparatus may be performed based on the completion of the present procedure.

Each apparatus may store pieces of information received in the present procedure in association with one another.

After completing the present procedure, the UE may be in the second state or the fourth state or the fifth state or the sixth state.

Note that in a case that the present procedure is performed using the non-3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 3.5.

3.4. PDU Session Release Procedure in PLMN

Now, the PDU session release procedure in the PLMN will be described. Here, in the description below, the PDU session release procedure in the PLMN is performed via the same access (i.e., 3GPP access) as an access for which the procedure in Section 3.1 or 3.2 is performed. In this case, the PDU session release procedure in the PLMN may be performed by the UE in the first state or the third state or the fourth state. Note that, in a case that the procedure in Section 3.1 or 3.2 is performed using the non-3GPP access, and the PDU session release procedure in the PLMN is performed using the non-3GPP access, the procedure may be performed by the UE in the first state or the third state or the fifth state. Hereinafter, the PDU session release procedure in the PLMN is also referred to as the PDU session release procedure or the present procedure. The PDU session release procedure includes a network-initiated PDU session release procedure and a UE-initiated PDU session release procedure. The PDU session release procedure may be a procedure for releasing a PDU session. In a case of detecting that the UE has exited the area where the UE can communicate with the PLMN and/or has entered the area where the UE can communicate with the SNPN, or the like, each apparatus may perform the PDU session release procedure. In particular, in a case that a PDU session configured with SSC mode 2 is established, the present procedure may be performed.

3.4.1 Network-Initiated PDU Session Release Procedure

Figure 12:
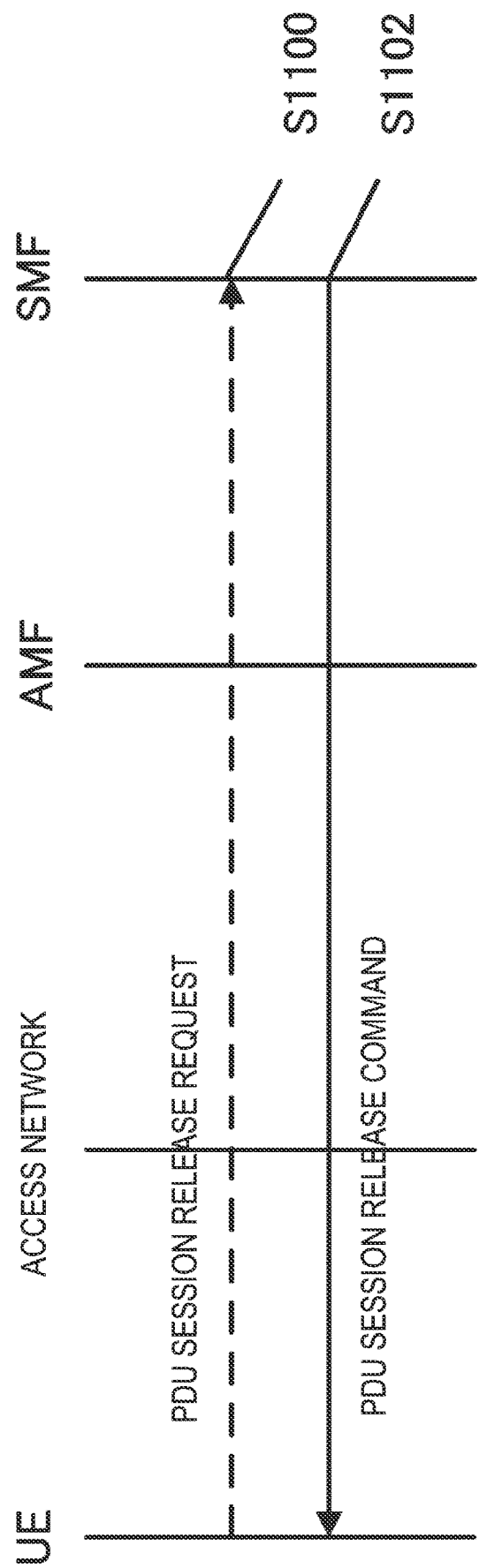
FIG. 12 is a diagram illustrating a PDU session release procedure.

First, the network-initiated PDU session release procedure will be described by using FIGS. 1, 2, and 12. Hereinafter, the network-initiated PDU session release procedure in the PLMN is also referred to as the PDU session release procedure or the present procedure. The SMF_220 (hereinafter also referred to as the SMF) initiates the present procedure by transmitting a PDU session release command (PDU SESSION RELEASE COMMAND) message to the UE (S1102). Here, the PDU session release command message is a message included in the NAS message transmitted and/or received on the N1 interface, but is actually a message transmitted by the SMF to the UE via the AMF_210 (hereinafter also referred to as the AMF) and the access network_100 (hereinafter also referred to as the access network).

The SMF may include at least one piece of identification information out of 71st to 73rd identification information and 75th identification information in the PDU session release command message for transmission. Note that which of the 71st to 73rd identification information and the 75th identification information is included in the PDU session release command message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the SMF may include at least one of the 71st to 73rd identification information and the 75th identification information in the PDU session release command message for transmission. Note that the 71st identification information may indicate PDU session ID #1 for identifying the first PDU session.

By transmitting at least one of these pieces of identification information and/or the PDU session release command message, the SMF may indicate release of the PDU session established in the PLMN, and/or may indicate initiation of the registration procedure and/or the PDU session establishment procedure for the SNPN, and/or may indicate initiation of the registration procedure and/or the PDU session establishment procedure for the PLMN via the SNPN, and/or may indicate change from direct connection to the PLMN to connection to the PLMN via the SNPN, and/or may indicate change from a PDU session directly established for the PLMN to a PDU session established for the PLMN via the SNPN, and/or may indicate activation of the SNPN access mode, and/or may indicate operation in the SNPN access mode.

In a case of receiving the PDU session release command message from the SMF, the UE can recognize the contents of each piece of identification information included in the PDU session release command message. The UE may then determine the behavior of the UE based on the reception of the de-registration request message, and/or each piece of identification information.

In other words, the UE may release the PDU session established in the PLMN, or may initiate the registration procedure and/or the PDU session establishment procedure for the SNPN, or may determine change from direct connection to the PLMN, in which the registration procedure and/or the PDU session establishment procedure may be initiated for the PLMN via the SNPN, to connection to the PLMN via the SNPN, or perform processing for changing from a PDU session directly established for the PLMN to a PDU session established for the PLMN via the SNPN, may activate the SNPN access mode, or configure operation in the SNPN access mode. These may be performed while the present procedure is being performed, or may be performed after completion of the present procedure.

The UE that receives the PDU session release command may transmit the PDU session release complete (PDU SESSION RELEASE COMPLETE) message to the SMF. Here, the PDU session release complete message is a message included in a NAS message transmitted and/or received on the N1 interface via the AMF.

Each apparatus may store pieces of information received in the present procedure in association with one another.

After completing the present procedure, the UE may be in the second state or the fourth state or the fifth state or the sixth state.

Note that in a case that the present procedure is performed using the non-3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 3.5.

3.4.2 UE-Initiated PDU Session Release Procedure

Now, a UE-initiated PDU session release procedure will be described by using FIGS. 1, 2, and 12. Hereinafter, the UE-initiated PDU session release procedure in the PLMN is also referred to as the PDU session release procedure or the present procedure. The UE initiates the present procedure by transmitting a PDU session release request (PDU SESSION RELEASE REQUEST) message to the SMF_220 (hereinafter also referred to as the SMF) (S1100). Here, the PDU session release request message is a message included in the NAS message transmitted and/or received on the N1 interface, but is actually a message transmitted by the UE to the SMF via the access network_100 (hereinafter also referred to as the access network) and the AMF_210 (hereinafter also referred to as the AMF).

The UE may include 81st identification information in the PDU session release request message for transmission. Note that which of the 81st identification information is included in the PDU session release request message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the UE may include the 81st identification information in the PDU session release request message for transmission. The 81st identification information may indicate PDU session ID #1 for identifying the first PDU session.

In a case of receiving the PDU session release request message from the UE, the SMF may determine the behavior of the SMF based on the reception of the PDU session release request message.

For example, the SMF may include at least one piece of identification information out of the 71st to 73rd identification information and the 75th identification information in the PDU session release command message for transmission (S1102). Note that which of the 71st to 73rd identification information and the 75th identification information is included in the PDU session release command message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the SMF may include at least one of the 71st to 73rd identification information and the 75th identification information in the PDU session release command message for transmission. Note that the 71st identification information may indicate PDU session ID #1 for identifying the first PDU session.

By transmitting at least one of these pieces of identification information and/or the PDU session release command message, the SMF may indicate release of the PDU session established in the PLMN, and/or may indicate initiation of the registration procedure and/or the PDU session establishment procedure for the SNPN, and/or may indicate initiation of the registration procedure and/or the PDU session establishment procedure for the PLMN via the SNPN, and/or may indicate change from direct connection to the PLMN to connection to the PLMN via the SNPN, and/or may indicate change from a PDU session directly established for the PLMN to a PDU session established for the PLMN via the SNPN, and/or may indicate activation of the SNPN access mode, and/or may indicate operation in the SNPN access mode.

In a case of receiving the PDU session release command message from the SMF, the UE can recognize the contents of each piece of identification information included in the PDU session release command message. The UE may then determine the behavior of the UE based on the reception of the de-registration request message, and/or each piece of identification information.

In other words, the UE may release the PDU session established in the PLMN, or may initiate the registration procedure and/or the PDU session establishment procedure for the SNPN, or may determine change from direct connection to the PLMN, in which the registration procedure and/or the PDU session establishment procedure may be initiated for the PLMN via the SNPN, to connection to the PLMN via the SNPN, or perform processing for changing from a PDU session directly established for the PLMN to a PDU session established for the PLMN via the SNPN, may activate the SNPN access mode, or configure operation in the SNPN access mode. These may be performed while the present procedure is being performed, or may be performed after completion of the present procedure.

The UE that receives the PDU session release command may transmit the PDU session release complete (PDU SESSION RELEASE COMPLETE) message to the SMF. Here, the PDU session release complete message is a message included in the NAS message transmitted and/or received on the N1 interface via the AMF, but is actually a message transmitted by the UE to the SMF via the access network and the AMF.

Each apparatus may store pieces of information received in the present procedure in association with one another.

After completing the present procedure, the UE may be in the second state or the fourth state or the fifth state or the sixth state.

Note that in a case that the present procedure is performed using the non-3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 3.5.

3.5. Registration Procedure for SNPN

Now, the Registration procedure in the SNPN will be described by using FIGS. 3, 4, and 8.

Here, in the PLMN, the UE having performed the procedure in Section 3.3 or Section 3.4 may be in the second state or the fourth state or the fifth state or the sixth state, as described above.

In the PLMN, the UE not having performed the procedure in Section 3.3 or Section 3.4, may be in the second state or the fourth state or the fifth state or the sixth state, for example, in a case that movement or the like causes connectivity with the PLMN to be terminated, causes the registered state in the PLMN to transition to the deregistered state, causes the PDU session in the PLMN to be released, causes the UE to exit the area where the UE can communicate with the PLMN, causes the UE to enter the area where the UE can communicate with the SNPN, or the like.

The UE in these states may be able to perform the SNPN selection procedure to select a certain SNPN, and may perform the registration procedure in the selected SNPN. A PLMN ID and a Network Identifier (NID) for identifying the SNPN may be, for example, originally held by the UE or included in the system information broadcast from a base station of the SNPN. The UE may be able to identify and select the SNPN by using the PLMN ID and the NID.

Here, a case in which the registration procedure in the SNPN is performed using the 3GPP access is described. In this case, the registration procedure in the SNPN may be performed by the UE in the second state or the fifth state or the sixth state. Note that the registration procedure in the SNPN may be performed using the non-3GPP access and that in this case, the registration procedure in the SNPN may be performed by the UE in the second state or the fourth state or the sixth state.

Hereinafter, the registration procedure in the SNPN is also referred to as the registration procedure or the present procedure. The registration procedure is a procedure initiated by the UE for registering with the access network_102 (hereinafter also referred to as the access network), and/or the core network_202 (hereinafter also referred to as the core network), and/or the DN_252 (hereinafter also referred to as the DN). In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. In addition, the UE may initiate the registration procedure, based on completion of the registration procedure, or completion of the PDU session establishment procedure, or information received from the network in each procedure. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

First, the UE initiates the registration procedure by transmitting a Registration request message to the AMF_212 (hereinafter also referred to as the AMF) using the 3GPP access (access network_102) (S600), (S602), and (S604). Here, the 3GPP access may include the base station apparatus_112 (hereinafter also referred to as the base station apparatus). Specifically, the UE transmits, to the base station apparatus (hereinafter also referred to as the gNB), an RRC message including the Registration request message (S600). Note that the registration request message is a NAS message transmitted and/or received over the N1 interface. The RRC message may be a control message transmitted and/or received between the UE and the base station apparatus. The NAS message is processed in the NAS layer, and the RRC message is processed in the RRC layer, which is lower than the NAS layer.

Here, the UE can include at least one piece of identification information out of the 1st to 4th identification information in the registration request message and/or the RRC message for transmission. In this regard, the 1st to 4th identification information may be identical to or different from the 1st to 4th identification information in Section 3.1.

The UE may include at least one of these pieces of identification information in a control message different from the control messages described above, for example, a control message of a lower layer than the RRC layer (for example, the Medium Access Control (MAC) layer, the Radio Link Control (RLC) layer, the Packet Data Convergence Protocol (PDCP) layer, the Service Data Adaptation Protocol (SDAP) layer, or the like), and may transmit the control message. Note that, by transmitting these pieces of identification information, the UE may indicate that the UE supports each function, may indicate a request of the UE, or may indicate both of these.

Note that the UE may select or determine whether to transmit at least one of these pieces of identification information based on the UE capability information, and/or the UE policy, and/or the UE state, and/or the user registration information, and/or a context stored in the UE, and/or the like.

The UE may include information other than the identification information described above in the registration request message and/or the RRC message, and may include, for example, the UE ID and/or the PLMN ID and/or the AMF identification information in the message for transmission. Here, the AMF identification information may be information for identifying an AMF or a set of AMFs, and may be, for example, a 5G S-Temporary Mobile Subscription Identifier (5G-S-TMSI) or a Globally Unique AMF Identifier (GUAMI).

In a case of receiving the RRC message including the registration request message, the base station apparatus selects the AMF to transfer the registration request message (S602). Note that the base station apparatus can select the AMF based on a received message and/or information. Note that the base station apparatus may select the AMF based on other conditions.

The base station apparatus extracts the registration request message from the received RRC message and transfers the registration request message to the selected AMF (S604). Note that in a case that at least one piece of identification information out of the 1st to 4th identification information is not included in the registration request message but in the RRC message, the identification information included in the RRC message may be transferred to the selected AMF together with the registration request message (S604).

In a case of receiving the registration request message, the AMF can perform the 1st condition fulfillment determination. The 1st condition fulfillment determination is intended to determine whether the network accepts a request of the UE. In a case that the 1st condition fulfillment determination is true, the AMF performs steps S610 to S612 of the procedure. In a case that the first condition fulfillment determination is false, the AMF may perform step S610 of the procedure.

The first condition fulfillment determination may be performed by a network function (also referred to as an NF)

other than the AMF. The NF may be, for example, a Network Slice Selection Function (NSSF), a Network Data Analytics Function (NWDAF), a Policy Control Function (PCF), or the like. In a case that the NF other than the AMF performs the first condition fulfillment determination, the AMF may provide the NF with at least a part of information necessary for performing the first condition fulfillment determination, specifically, information received from the UE. Then, in a case that the NF determines true or false of the first condition fulfillment determination based on the information received from the AMF, the NF may notify the AMF of information including results (in other words, true or false) of the first condition fulfillment determination. The AMF may determine the identification information and/or the control message to be transmitted to the UE, based on the result of the first condition fulfillment determination received from the NF.

Note that in a case that the first condition fulfillment determination is true, the control message transmitted and/or received in S610 may be the Registration accept message. In a case that the first condition fulfillment determination is false, the control message transmitted and/or received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, in a case that the network allows the request of the UE, the first condition fulfillment determination may be true, whereas in a case that the network does not allow the request of the UE, the first condition fulfillment determination may be false. In a case that a network with which the UE is registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false.

Here, assuming that the first condition fulfillment determination is true, the description is continued.

The AMF may include one or more pieces of identification information out of the 11th to the 16th identification information in the control message for transmission. The 11th identification information may be information transmitted only in a case that the 1st identification information is received or may be information transmitted even in a case that the 1st identification information is not received. In this regard, the 11th to 16th identification information may be identical to or different from the 11th to 16th identification information in Section 3.1. Note that, by transmitting these pieces of identification information and/or the control message, the AMF may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF is scheduled to perform the NSSAA procedure after completion of the present procedure or in parallel with the present procedure although there is no S-NSSAI (allowed NSSAI) allowed for the UE at the time of transmission of the control message (registration accept message), or the AMF is in the middle of performing the NSSAA procedure between the UE and the network, or the AMF includes the pending NSSAI in the control message for transmission, then the AMF may include an empty value in the allowed NSSAI for transmission.

Note that the AMF may determine at least which piece of identification information out of the 11th to the 16th identification information is to be included in the control message, based on each piece of received identification information, and/or subscriber information, and/or the network capability information, and/or the operator policy, and/or the network state, and/or the user registration information, and/or the context stored in the AMF, and/or the like.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

The UE receives the control message (registration accept message) via the base station apparatus (S610). By receiving the registration accept message, the UE can recognize that the request from the UE on the registration request message is accepted, and recognize details of various pieces of identification information included in the registration accept message.

The UE can further transmit a registration complete message to the AMF via the base station apparatus as a response message to the registration accept message (S612). Here, the registration complete message is a NAS message transmitted and/or received on the N1 interface; however, the registration complete message may be included in an RRC message for transmission and/or reception between the UE and the base station apparatus.

The AMF receives the registration complete message via the base station apparatus (S612). Each apparatus completes the present procedure based on transmission and/or reception of the registration accept message and/or the registration complete message.

Note that each apparatus may transition to or maintain a state in which the UE is registered with the network (RM_REGISTERED state or 5GMM-REGISTERED state) based on the transmission and/or reception of the registration accept message and/or the registration complete message or completion of the registration procedure.

Each apparatus may store pieces of information received in the present procedure in association with one another.

Even after completing the present procedure, the UE may be in the second state or the fifth state or the sixth state.

Note that in a case that the present procedure is performed using the non-3GPP access, the UE may be in the second state or the fourth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

3.6. PDU Session Establishment Procedure for SNPN

Now, by using FIGS. 3, 4, and 9, the PDU session establishment procedure will be described that is performed by the UE to establish a PDU session in the SNPN after performing the registration procedure in Section 3.5 once or more than once. Here, a case is described below in which the PDU session establishment procedure is performed via the same access (in other words, 3GPP access) as an access for which the registration procedure in Section 3.5 is performed. In this case, the PDU session establishment procedure may be performed by the UE in the second state or the fifth state or the sixth state. Note that in a case that the registration procedure in Section 3.5 is performed using the non-3GPP access, the UE in the second state or the fourth state or the sixth state may perform the PDU session establishment procedure using the non-3GPP access. The PDU session establishment procedure in the SNPN is hereinafter also referred to as the PDU session establishment procedure or the present procedure.

First, the UE initiates the PDU session establishment procedure by transmitting the NAS message including the N1 SM container including the PDU session establishment request message, to the AMF_212 (hereinafter also referred to as the AMF) using the 3GPP access (access network_102) (S800). Here, the 3GPP access may include the base station apparatus_112 (hereinafter also referred to as the base station apparatus). In other words, the UE transmits the NAS message to the AMF via the base station apparatus. The NAS message may be, for example, a message transmitted via the N1 interface, and may be an uplink NAS transport (UL NAS TRANSPORT) message.

The UE can notify the network side of the what is requested by the UE by including at least one piece of identification information out of the 21st to 26th identification information and the 28th identification information in the PDU session establishment request message, and/or the N1 SM container, and/or the NAS message for transmission. In this regard, the 21st to 26th identification information and the 28th identification information may be identical to or different from the 21st to 26th identification information and the 28th identification information in Section 3.2. Here, the 21st identification information is assumed to indicate PDU session ID #2 that identifies a second PDU session.

Note that the UE may determine which of 21st to 26th identification information and the 28th identification information is transmitted to the network or not based on the UE capability information, and/or the UE policy, and/or the UE state, and/or the user registration information, and/or the context stored in the UE, and/or the like.

Note that the UE may include these pieces of identification information in a control message different from the control messages described above, for example, a control message from a lower layer than the NAS layer (for example, the RRC layer, the MAC layer, the RLC layer, the PDCP layer, the SDAP layer, or the like) or a control message from a higher layer than the NAS layer (for example, a transport layer, a session layer, a presentation layer, an application layer, or the like), and may transmit the control message.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like. Here, it is assumed that the SMF_222 (hereinafter also referred to as the SMF) is selected.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. A second condition fulfillment determination may be intended to determine whether the network accepts a request of the UE. In a case that the second condition fulfillment determination is true, the SMF may initiate the procedure in (A) of FIG. 9, whereas in a case that the second condition fulfillment determination is false, the SMF may initiate the procedure in (B) of FIG. 9.

Note that the second condition fulfillment determination may be performed by the NF other than the SMF. The NF may be, for example, NSSF, NWDAF, PCF, or NRF. In a case that the NF other than the SMF performs the second condition fulfillment determination, the SMF may provide the NF with at least a part of information necessary for performing the second condition fulfillment determination, specifically, information received from the UE (S806). Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the result of the second condition fulfillment determination received from the NF.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be true, whereas in a case that the network does not allow the request of the UE, the second condition fulfillment determination may be false. In a case that a network as a connection destination of the UE and/or an apparatus in the network supports the function requested by the UE, the second condition fulfillment determination may be true, whereas in a case that the network and/or the apparatus does not support the function requested by the UE, the second condition fulfillment determination may be false. In a case that the transmitted and/or received identification information is allowed, the second condition fulfillment determination may be true, whereas in a case that the transmitted and/or received identification information is not allowed, the second condition fulfillment determination may be false. Note that the condition for determining true or false of the second condition fulfillment determination need not necessarily be limited to the condition described above.

Now, each step of the procedure in (A) of FIG. 9 will be described.

Next, the SMF may select the UPF for a PDU session to be established, and may transmit the N4 session establishment request message to the selected UPF via the N4 interface, for example (S808). The N4 session establishment request message may include at least a portion of the PCC rule received from the PCF.

Here, the SMF may select one or more UPFs, based on the information and the like (a message, a container, information) received from the AMF, and/or the information received from the PCF such as the PCC rule, and/or the subscriber information, and/or the network capability information, and/or the UE policy, and/or the operator policy, and/or the network state, and/or the user registration information, and/or the context stored in the SMF, and/or the like. In a case that multiple UPFs are selected, the SMF may transmit the N4 session establishment request message to each UPF. The description below assumes that UPF_232 (hereinafter also referred to as the UPF) is selected.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Then, the AMF that receives the N1 SM container, and/or the N2 SM information, and/or the PDU session ID transmits the NAS message to the UE via the base station apparatus included in the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the base station apparatus included in the access network (S814), the base station apparatus receives the N2 PDU session request message and transmits the NAS message to the UE (S816). Here, the N2 PDU session request message may include the NAS message and/or the N2 SM information. The NAS message may include the PDU session ID and/or the N1 SM container.

The PDU session establishment accept message may be a response message to the PDU session establishment request. The PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message has been accepted.

Here, the SMF and/or the AMF may include at least one piece of identification information out of the 31st to 37th identification information in the PDU session establishment accept message, and/or the N1 SM container, and/or the NAS message, and/or the N2 SM information, and/or the N2 PDU session request message for transmission. Here, the 31st to 33rd identification information and the 35th and 36th identification information may be identical to or different from the 21st to 23rd identification information and the 25th and 26th identification information in the present procedure. The 34th and 37th identification information may be identical to or different from the 34th and 37th identification information in Section 3.2. In this regard, the 31st identification information is assumed to be identical to the 21st identification information in the present procedure.

Note that, by transmitting these pieces of identification information and/or the PDU session establishment accept message, the SMF may indicate that the network supports each function, may indicate that the request of the UE has been accepted, may indicate that the request from the UE is not allowed, or may indicate information of a combination of these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting at least one of these pieces of identification information, the SMF and/or the AMF can notify the UE of details of these pieces of identification information.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the network capability information, and/or the UE policy, and/or the operator policy, and/or the network state, and/or the user registration information, and/or the context stored in the SMF and/or the AMF, and/or the like.

Next, in a case that the UE receives the NAS message via the N1 interface, for example (S816), the UE can recognize that the request of the UE by the PDU session establishment request message has been accepted, and/or details of the information and the like (a message, a container, information) included in the NAS message. For example, based on the received 31st, 32nd, and 33rd identification information, the UE may recognize the PDU session type and the SSC mode configured for the PDU session identified by the 31st identification information. The UE may recognize functions supported by the network based on the received 34th identification information.

Now, each step of the procedure in (B) of FIG. 9 will be described.

First, based on reception of the PDU session establishment request message, the SMF transmits the N1 SM container and/or the PDU session ID to the AMF, for example, via the N11 interface (S818). Here, the N1 SM container may include the PDU session establishment reject message.

Then, in a case of receiving the N1 SM container and/or the PDU session ID, the AMF transmits the NAS message to the UE via a first base station apparatus included in the access network (S820) (S822). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message to the PDU session establishment request. The PDU session establishment reject message may indicate that establishment of the PDU session has been rejected.

Here, by transmitting the PDU session establishment reject message, and/or the N1 SM container, and/or the PDU session ID, and/or the NAS message, the SMF and/or the AMF may indicate that the request of the UE by the PDU session establishment request message has been rejected.

Note that, by transmitting the PDU session establishment reject message, the SMF may indicate that the network does not support each function, may indicate that the request of the UE has been rejected, may indicate that the request from the UE is not allowed, or may indicate a combination of the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting at least one of these pieces of identification information, the SMF and/or the AMF can notify the UE of details of these pieces of identification information.

Then, in a case of receiving the NAS message via the N1 interface, for example (S822), the UE can recognize that the request of the UE by the PDU session establishment request message has been rejected, and/or details of the information and the like (a message, a container, information) included in the NAS message.

Each apparatus may complete the present procedure, based on transmission and/or reception of the PDU session establishment accept message. At this time, each apparatus may transition to a state in which the apparatus can communicating with the DN using the established PDU session.

Each apparatus may complete the present procedure based on transmission and/or reception of the PDU session establishment reject message. At this time, each apparatus fails to establish a PDU session, and thus the apparatus fails to communicate with the DN in a case that no PDU session has been established.

Note that each type of processing performed by the UE based on reception of each piece of identification information described above may be performed during the present procedure or after completion of the present procedure or may be performed based on completion of the present procedure after completion of the present procedure.

Each apparatus may store pieces of information received in the present procedure in association with one another.

Even after completing the present procedure, the UE may be in the second state or the fifth state or the sixth state.

Note that in a case that the present procedure is performed using the non-3GPP access, the UE may be in the second state or the fourth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

Here, the description below assumes that the PDU session establishment accept message is received and that a PDU session in the SNPN is established. The UE in these states may then perform the procedure of the procedure in Section 3.7.

3.7. Registration Procedure for PLMN (Via SNPN)

Figure 8:
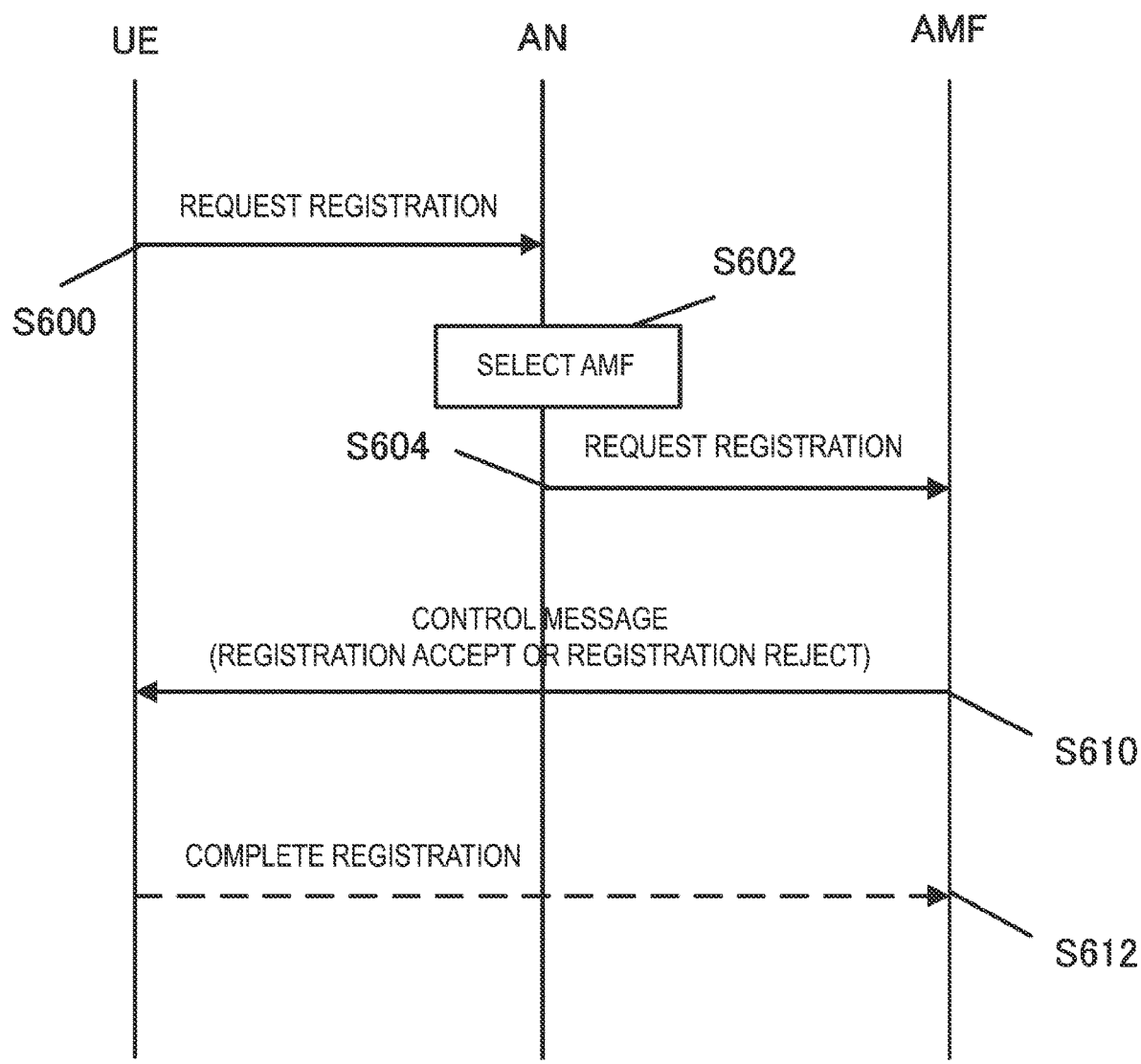
FIG. 8 is a diagram illustrating a registration procedure.

Now, a case is described by using FIGS. 3, 4, and 8, in which, in SNPN, after performing the registration procedure in Section 3.5 and the PDU session establishment procedure in Section 3.6, the UE performs the registration procedure for the PLMN via the SNPN.

Specifically, a case is described below in which the registration procedure of Section 3.5, and the PDU session establishment procedure of Section 3.6 are performed using the 3GPP access, and the registration procedure for the PLMN (via the SNPN) is performed using the non-3GPP access. In this case, the UE may perform the registration procedure for the PLMN (via the SNPN) after transitioning to the first state or the second state or the fifth state after completing the PDU session establishment procedure in Section 3.6.

Note that in a case that the registration procedure in Section 3.5 and the PDU session establishment procedure in Section 3.6 are performed using non-3GPP access, after completing the PDU session establishment procedure in Section 3.6, the UE may perform a registration procedure for the PLMN (via SNPN) using the 3GPP access after transitioning to the first state or the second state or the fourth state.

Note that the state transitions after completion of the procedure in Section 3.6 and before the initiation of the present procedure may be performed based on the information and control messages transmitted and/or received in the procedures performed before the present procedure. The state transitions may be performed in a case that the UE determines to initiate the present procedure.

Hereinafter, the registration procedure in the PLMN (via the SNPN) is also referred to as the registration procedure or the present procedure. The registration procedure in the PLMN (via the SNPN) as used herein is the registration procedure performed for the PLMN by utilizing the PDU session established by the PDU session establishment procedure in the SNPN.

The registration procedure in the PLMN in Section 3.1 can be applied to the registration procedure in the SNPN (via the PLMN) in a case of being performed using the non-3GPP access, by using the following interpretation.

First, the 3GPP access is interpreted as the non-3GPP access. The base station apparatus is interpreted as the base station apparatus and/or the N3IWF. The RRC message transmitted and/or received between the UE and the base station apparatus is interpreted as an IKEv2 message transmitted and/or received between the UE and the N3IWF. The information, control message, and the like included in the RRC message are interpreted as those included in the IKEv2 message. Specifically, the registration request message, and/or the registration accept message, and/or the registration complete message, and/or the registration reject message, are included in the IKEv2 message for transmission and/or reception via the N3IWF. The processing performed by the base station apparatus is interpreted as processing performed by the N3IWF. For example, the selection of the AMF by the base station apparatus may be performed by the N3IWF.

The description below focuses on differences from the registration procedure in Section 3.1. In other words, the description in Section 3.1 can be applied to lacking portions of the description below.

First, the UE initiates the registration procedure by transmitting the Registration request message to the AMF_210 (hereinafter also referred to as the AMF) using the non-3GPP access and the N3IWF_240 (hereinafter also referred to as the N3IWF) (S600), (S602), and (S604). Here, the non-3GPP access may include the access network_102, and the core network_202, and the DN_252. Specifically, the UE transmits, to the N3IWF using the non-3GPP access, an IKEv2 message including the registration request message (S600). Note that the registration request message is a NAS message transmitted and/or received over the N1 interface. The IKEv2 message may be a control message transmitted and/or received between the UE and the N3IWF. The NAS message may be processed in the NAS layer, and the IKEv2 message may be processed in a lower layer than the NAS layer.

Here, the UE can include at least one piece of identification information out of the 1st to 4th identification information in the registration request message and/or the IKEv2 message for transmission. In this regard, the 1st to 4th identification information may be identical to or different from the 1st to 4th identification information in Section 3.1. The 1st to 4th identification information may be identical to or different from the 1st to 4th identification information in Section 3.5.

The UE may include information other than the identification information described above in the registration request message and/or the IKEv2 message, and may include, for example, the UE ID and/or the PLMN ID and/or the AMF identification information in the message for transmission. Here, the PLMN ID may be the same as the PLMN ID included in the registration request message and/or RRC message in section 3.1.

In a case of receiving the IKEv2 message including the registration request message, the N3IWF selects the AMF to transfer the registration request message (S602). Note that the N3IWF can select the AMF based on information included in the received message and/or information. Note that the N3IWF may select the AMF based on other conditions. Here, it is assumed that the AMF_210 (hereinafter also referred to as the AMF) identical to the AMF in Section 3.1 is selected, but a different AMF may be selected.

The N3IWF extracts the registration request message from the received IKEv2 message and transfers the registration request message to the selected AMF (S604). Note that in a case that at least one piece of identification information out of the 1st to 4th identification information is not included in the registration request message but in the IKEv2 message, the identification information included in the IKEv2 message may be transferred to the selected AMF together with the registration request message (S604).

In a case that the AMF receives the registration request message, the AMF can perform the 1st condition fulfillment determination. The following may be identical to those in Section 3.1: the first condition fulfillment determination, and/or the performance conditions for the first condition fulfillment determination, and/or the determination criterion for the true or false of the first condition fulfillment determination, and/or the behavior performed in a case that the first condition fulfillment determination is true or false, and/or the control message transmitted and/or received in a case that the first condition fulfillment determination is true or false, and/or the like.

The first condition fulfillment determination may be performed by a network function (also referred to as an NF) other than the AMF.

Here, assuming that the first condition fulfillment determination is true, the description is continued.

The AMF may include one or more pieces of identification information out of the 11th to the 16th identification information in the control message for transmission. In this regard, the 11th to 16th identification information may be identical to or different from the 11th to 16th identification information in Section 3.1. The 11th to 16th identification information may be identical to or different from the 11th to 16th identification information in Section 3.5.

The UE receives the control message (registration accept message) via the N3IWF (S610). By receiving the registration accept message, the UE can recognize that the request from the UE on the registration request message is accepted, and recognize details of various pieces of identification information included in the registration accept message.

The UE can further transmit the registration complete message to the AMF via the N3IWF as a response message to the registration accept message (S612). Here, the registration complete message is a NAS message transmitted and/or received on the N1 interface; however, the registration complete message may be included in an IKEv2 message for transmission and/or reception between the UE and the N3IWF.

The AMF receives the registration complete message via the N3IWF (S612). Each apparatus completes the present procedure based on transmission and/or reception of the registration accept message and/or the registration complete message.

Note that each apparatus may transition to or maintain a state in which the UE is registered with the network (RM-_REGISTERED state or 5GMM-REGISTERED state) based on the transmission and/or reception of the registration accept message and/or the registration complete message or completion of the registration procedure.

Each apparatus may store pieces of information received in the present procedure in association with one another.

Even after completing the present procedure, the UE may be in the first state or the second state or the fifth state.

Note that in a case that the present procedure is performed using 3GPP access, the UE may be in the first state or the second state or the fourth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

3.8. PDU Session Establishment Procedure for PLMN (Via SNPN)

Now, by using FIGS. 3, 4, and 9, the PDU session establishment procedure will be described that is performed by the UE to establish a PDU session for the PLMN via the SNPN after performing the registration procedure in Section 3.7 once or more than once. Here, a case is described below in which the PDU session establishment procedure is performed via the same access (in other words, non-3GPP access) as an access for which the registration procedure in Section 3.7 is performed. In this case, the PDU session establishment procedure may be performed by the UE in the first state or the second state or the fifth state. Note that, in a case that the registration procedure in Section 3.7 is performed using the 3GPP access, the UE in the first state or the second state or the fourth state may perform the PDU session establishment procedure using the 3GPP access. The PDU session establishment procedure in the PLMN is hereinafter also referred to as the PDU session establishment procedure or the present procedure.

The PDU session establishment procedure in the PLMN in Section 3.2 can be applied to the PDU session establishment procedure in the PLMN (via the SNPN) in a case of being performed using the non-3GPP access, by using the following interpretation.

First, the 3GPP access is interpreted as the non-3GPP access. The base station apparatus is interpreted as the base station apparatus and/or the N3IWF. The RRC message transmitted and/or received between the UE and the base station apparatus is interpreted as the IKEv2 message transmitted and/or received between the UE and the N3IWF. The information, control message, and the like included in the RRC message are interpreted as those included in the IKEv2 message. Specifically, the PDU session establishment request message, and/or the PDU session establishment accept message, and/or the PDU session establishment reject message may be included in the IKEv2 message for transmission and/or reception via the N3IWF.

The description below focuses on differences from the PDU session establishment procedure in Section 3.2. In other words, the description in Section 3.2 can be applied to lacking portions of the description below.

First, the UE initiates the PDU session establishment procedure by transmitting the NAS message including the N1 SM container including the PDU session establishment request message, to the AMF_210 (hereinafter also referred to as the AMF) using the non-3GPP access and the N3IWF_240 (hereinafter also referred to as the N3IWF) (S800). Here, the non-3GPP access may include the access network_102, and the core network_202, and the DN_252. In other words, the UE transmits the NAS message to the AMF via the N3IWF. The NAS message may be, for example, a message transmitted via the N1 interface, and may be an uplink NAS transport (UL NAS TRANSPORT) message.

The UE can notify the network side of what is requested by the UE by including at least one piece out of the 21st to 28th identification information in the PDU session establishment request message, and/or the N1 SM container, and/or the NAS message for transmission. In this regard, the 21st to 26th identification information and the 28th identification information may be identical to or different from the 21st to 26th identification information and the 28th identification information in Section 3.6. The 21st identification information needs to be different from the 21st identification information in Section 3.6. Here, the 21st identification information is assumed to indicate PDU session ID #3 for identifying the third PDU session. The 22nd to 26th identification information and the 28th identification information may be identical to or different from the 22nd to 26th identification information and the 28th identification information in Section 3.6. The 27th identification information needs to be different from the 21st identification information in the present section. The 27th identification information may be identical to the 21st identification information in Section 3.6. In other words, the 27th identification information may indicate PDU session ID #2 indicating the PDU session established in the SNPN.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Here, it is assumed that the SMF_220 (hereinafter also referred to as the SMF) identical to the SMF in Section 3.2 is selected, but a different SMF may be selected.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. The following may be identical to those in Section 3.2: the second condition fulfillment determination, and/or the performance conditions for the second condition fulfillment determination, and/or the determination criterion for the true or false of the second condition fulfillment determination, and/or the behavior performed in a case that the second condition fulfillment determination is true or false, and/or the control message transmitted and/or received in a case that the second condition fulfillment determination is true or false, and/or the like.

Note that the second condition fulfillment determination may be performed by the NF other than the SMF.

Now, each step of the procedure in (A) of FIG. 9 will be described.

Next, the SMF may select the UPF for a PDU session to be established, and may transmit the N4 session establishment request message to the selected UPF via the N4 interface, for example (S808). Here, it is assumed that the UPF_230 (hereinafter also referred to as the UPF) identical to the UPF in Section 3.2 is selected, but a different UPF may be selected. The N4 session establishment request message may include at least a portion of the PCC rule received from the PCF.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Then, the AMF that receives the N1 SM container, and/or the N2 SM information, and/or the PDU session ID (13th identification information) transmits the N2 PDU session request message to the N3IWF (S814). Here, the N2 PDU session request message may include the N2 SM information and/or the NAS message. The NAS message may include the PDU session ID and/or the N1 SM container.

Then, the N3IWF performs an IPsec child security association (SA) establishment procedure with the UE over the access network, and transmits the NAS message to the UE after the IPsec Child SA is established between the UE and the N3IWF (S816).

Specifically, to establish an IPsec Child SA for the PDU session, the N3IWF transmits an IKE Create_Child_SA request message to the UE in accordance with the IKEv2 standard described in RFC 7296. Here, the IKE Create_Child_SA request message may indicate that the requested IPsec Child SA operates in a tunnel mode. The IKE Create_Child_SA request message may include a PDU session ID associated with the Child SA.

Then, after accepting the IPsec Child SA, the UE transmits an IKE Create_Child_SA response message to the N3IWF.

As described above, the IPsec Child SA is established between the UE and the N3IWF.

After the IPsec Child SA is established, the N3IWF can transmit, to the UE, the NAS message including the PDU session establishment accept message (S816).

Here, the SMF and/or the AMF may include at least one piece of identification information out of the 31st to 37th identification information in the PDU session establishment accept message, and/or the N1 SM container, and/or the NAS message, and/or the N2 SM information, and/or the N2 PDU session request message for transmission. Here, the 31st to 33rd identification information and the 35th and 36th identification information may be identical to or different from the 21st to 23rd identification information and the 25th and 26th identification information in the present procedure. In this regard, the 31st identification information is assumed to be identical to the 21st identification information in the present procedure. In other words, the 31st identification information is assumed to indicate PDU session ID #3 for identifying the third PDU session.

The 31st to 37th identification information may be identical to or different from the 31st to 37th identification information in Section 3.2. The 31st to 37th identification information may be identical to or different from the 31st to 37th identification information in Section 3.6.

By transmitting at least one of these pieces of identification information, the SMF and/or the AMF can notify the UE of details of these pieces of identification information.

Then, in a case of receiving the NAS message (S816), the UE can recognize that the request of the UE by the PDU session establishment request message has been accepted, and/or can recognize details of the information and the like (a message, a container, information) included in the NAS message.

The UE can recognize the SSC mode configured for the PDU session identified by the 31st identification information based on the 31st and 33rd identification information received.

Now, each step of the procedure in (B) of FIG. 9 will be described.

First, based on reception of the PDU session establishment request message, the SMF transmits the N1 SM container and/or the PDU session ID to the AMF, for example, via the N11 interface (S818). Here, the N1 SM container may include the PDU session establishment reject message.

Then, the AMF that receives the N1 SM container, and/or the N2 SM information, and/or the PDU session ID (13th identification information) transmits the N2 PDU session request message to the N3IWF (S820). Here, the N2 PDU session request message may include the N2 SM information and/or the NAS message. The NAS message may include the PDU session ID and/or the N1 SM container.

Then, the N3IWF performs the IPsec child security association (SA) establishment procedure with the UE over the access network, and transmits the NAS message to the UE after the IPsec Child SA is established between the UE and the N3IWF (S822).

Specifically, to establish an IPsec Child SA for the PDU session, the N3IWF transmits an IKE Create_Child_SA request message to the UE in accordance with the IKEv2 standard described in RFC 7296. Here, the IKE Create_Child_SA request message may indicate that the requested IPsec Child SA operates in a tunnel mode. The IKE Create_Child_SA request message may include a PDU session ID associated with the Child SA.

Then, after accepting the IPsec Child SA, the UE transmits an IKE Create_Child_SA response message to the N3IWF.

As described above, the IPsec Child SA is established between the UE and the N3IWF.

After the IPsec Child SA has been established, the N3IWF can transmit, to the UE, the NAS message including the PDU session establishment reject message (S822).

Then, in a case of receiving the NAS message (S822), the UE can recognize that the request of the UE by the PDU session establishment request message has been rejected, and/or can recognize details of the information and the like (a message, a container, information) included in the NAS message.

Each apparatus may complete the present procedure, based on transmission and/or reception of the PDU session establishment accept message. At this time, each apparatus may transition to a state in which the apparatus can communicating with the DN using the established PDU session.

Each apparatus may complete the present procedure based on transmission and/or reception of the PDU session establishment reject message. At this time, each apparatus fails to establish a PDU session, and thus the apparatus fails to communicate with the DN in a case that no PDU session has been established.

Note that each type of processing performed by the UE based on reception of each piece of identification information described above may be performed during the present procedure or after completion of the present procedure or may be performed based on completion of the present procedure after completion of the present procedure.

Each apparatus may store pieces of information received in the present procedure in association with one another.

Even after completing the present procedure, the UE may be in the first state or the second state or the fifth state.

Note that in a case that the present procedure is performed using 3GPP access, the UE may be in the first state or the second state or the fourth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

Here, it is assumed that the PDU session establishment accept message is received and that the PDU session in the PLMN (via the SNPN) is established.

As described above, by using the PDU session established in the SNPN according to the procedure in Section 3.6 to perform the procedure in Section 3.7 and the present procedure, the PDU session for the PLMN using the non-3GPP access can be established. In other words, the UE may be in a state in which the UE has established a PDU session in the SNPN (second PDU session identified by PDU Session ID #2) and a PDU session in the PLMN (third PDU session identified by PDU Session ID #3).

As described above, by performing each procedure, the first PDU session can be transferred to the third PDU session.

4. Second Embodiment

In the present embodiment, a case opposite to the case in the first embodiment, in other words, a technique for transferring a third PDU session to a first PDU session, will be described.

In other words, in the SNPN, the UE performs a registration procedure in Section 4.1, and performs a PDU session establishment procedure in Section 4.2 to establish a second PDU session. Furthermore, on the PLMN via the established second PDU session (in other words, via the SNPN), the UE performs a registration procedure in Section 4.3, and performs a PDU session establishment procedure in Section 4.4 to establish a third PDU session. Then, in the PLMN, the UE may or may not perform a de-registration procedure in Section 4.5 or a PDU session release procedure in Section 4.6. In a case that a PDU session release procedure in Section 4.6 is performed, the UE may perform a PDU session release procedure in Section 4.7. Then, in the PLMN, the UE performs a registration procedure in Section 4.8, and performs a PDU session establishment procedure in Section 4.9 to establish a first PDU session. By performing these procedures, the UE can transfer the third PDU session to the first PDU session.

4.1. Registration Procedure for SNPN

As the present procedure, the procedure in Section 3.5 can be directly applied without any change. Thus, see Section 3.5.

Note that the UE in the second state or the fifth state or the sixth state may perform the present procedure using the 3GPP access. In this case, after completing the present procedure, the UE may be in a state in which the UE is registered with the SNPN. Even after completing the present procedure, the UE may be in the second state or the fifth state or the sixth state.

The UE in the second state or the fourth state or the sixth state may perform the present procedure using the non-3GPP access. In this case, after completing the present procedure, the UE may be in a state in which the UE is registered with the SNPN. Even after completing the present procedure, the UE may be in the second state or the fourth state or the sixth state.

Note that these states may be maintained or transitioned based on the information and control messages transmitted and/or received in this procedure, or may be maintained or transitioned based on the information and control messages transmitted and/or received in procedures performed prior to this procedure.

4.2. PDU Session Establishment Procedure for SNPN

The present procedure is performed after the procedure in Section 4.1 is performed. As the present procedure, the procedure in Section 3.6 can be directly applied without any change. Thus, see Section 3.6.

Note that the UE in the second state or the fifth state or the sixth state may perform the present procedure using the 3GPP access. In this case, after completing the present procedure, the UE may be in a state in which the UE has established a PDU session (second PDU session identified by PDU session ID #2) in the SNPN. Even after completing the present procedure, the UE may be in the second state or the fifth state or the sixth state.

The UE in the second state or the fourth state or the sixth state may perform the present procedure using the non-3GPP access. In this case, after completing the present procedure, the UE may be in a state in which the UE has established a PDU session (second PDU session identified by PDU session ID #2) in the SNPN. Even after completing the present procedure, the UE may be in the second state or the fourth state or the sixth state.

Note that these states may be maintained or transitioned based on the information and control messages transmitted and/or received in this procedure, or may be maintained or transitioned based on the information and control messages transmitted and/or received in procedures performed prior to this procedure.

4.3. Registration Procedure for PLMN (Via SNPN)

The present procedure is performed after the procedure in Section 4.2 is performed. As the present procedure, the procedure in Section 3.7 can be directly applied without any change. Thus, see Section 3.7.

Note that after completing the procedure in Section 4.2, the UE after transitioning to the first state or the second state or the fifth state may perform the present procedure using the non-3GPP access. In this case, after completing the present procedure, the UE may be in a state in which the UE is registered in the PLMN via the SNPN. Even after completing the present procedure, the UE may be in the first state or the second state or the fifth state.

After completing the procedure in Section 4.2, the UE after transitioning to the first state or the second state or the fourth state may perform the present procedure using the 3GPP access. In this case, after completing the present procedure, the UE may be in a state in which the UE is registered in the PLMN via the SNPN. Even after completing the present procedure, the UE may be in the first state or the second state or the fourth state.

Note that the state transitions after completion of the procedure in Section 4.2 and before the initiation of the present procedure may be performed based on the information and control messages transmitted and/or received in the procedures performed before the present procedure. The state transitions may be performed in a case that the UE determines to initiate the present procedure.

4.4. PDU Session Establishment Procedure for PLMN (Via SNPN)

The present procedure is performed after the procedure in Section 4.3 is performed. As the present procedure, the procedure in Section 3.8 can be directly applied without any change. Thus, see Section 3.8.

Note that the UE in the first state or the second state or the fifth state may perform the present procedure using the non-3GPP access. In this case, after completing the present procedure, the UE may be in a state in which the UE has established a PDU session (third PDU session identified by PDU session ID #3) in the PLMN via the SNPN. In other words, the UE may be in a state in which the UE has established the second PDU session for the SNPN and the third PDU session for the PLMN via the SNPN. Even after completing the present procedure, the UE may be in the first state or the second state or the fifth state.

The UE in the first state or the second state or the fourth state may perform the present procedure using the 3GPP access. In this case, after completing the present procedure, the UE may be in a state in which the UE has established a PDU session (third PDU session identified by PDU session ID #3) in the PLMN via the SNPN. In other words, the UE may be in a state in which the UE has established the second PDU session for the SNPN and the third PDU session for the PLMN via the SNPN. Even after completing the present procedure, the UE may be in the first state or the second state or the fourth state.

Note that these states may be maintained or transitioned based on the information and control messages transmitted and/or received in this procedure, or may be maintained or transitioned based on the information and control messages transmitted and/or received in procedures performed prior to this procedure.

The UE in these states may perform or may not perform a procedure in Section 4.5 or a procedure in Section 4.6 after completing the present procedure. The UE in these states may perform a procedure in Section 4.8 without performing the procedure in Section 4.5 or Section 4.6 after completing the present procedure.

4.5. De-Registration Procedure in PLMN (Via SNPN)

Now, the de-registration procedure in the PLMN via the SNPN will be described that is performed by the UE after performing the procedure in Section 4.4. Here, a case is described below in which the de-registration procedure in the PLMN (via the SNPN) is performed via the same access (in other words, non-3GPP access) as an access for which the procedure in Section 4.3 or Section 4.4 is performed. In this case, the de-registration procedure in the PLMN (via the SNPN) may be performed by the UE in the first state or the second state or the fifth state. Note that in a case that the procedure in Section 4.3 or Section 4.4 is performed using the 3GPP access, the UE in the first state or the second state or the fourth state may perform the de-registration procedure in the PLMN (via the SNPN) using the 3GPP access. Hereinafter, the de-registration procedure in the PLMN via the SNPN is also referred to as the de-registration procedure or the present procedure. The de-registration procedure includes a network-initiated de-registration procedure and a UE-initiated de-registration procedure. The de-registration procedure may be a procedure for canceling registration of the UE registered with the network (the access network, and/or the core network, and/or the DN). In other words, the UE or the AMF may perform the de-registration procedure in a case that the UE is registered with the network (RM-REGISTERED state or 5GMM-REGISTERED state). In a case of detecting that the UE exits the area where the UE can communicate with the PLMN, each apparatus may perform the de-registration procedure. In particular, in a case that a PDU session configured with SSC mode 2 is established, the present procedure may be performed.

In a case that the UE completes the present procedure, a state of the registration in the PLMN via the SNPN may be in the deregistered state, and may be in a state in which the third PDU session established in the PLMN via the SNPN is released for the UE. In other words, the UE may be in a state in which the UE remains in the registered state in the SNPN, and the second PDU session established in the SNPN remains established.

4.5.1 Network-Initiated De-Registration Procedure

First, the network-initiated de-registration procedure will be described by using FIGS. 3, 4, and 10. Hereinafter, the network-initiated de-registration procedure in the PLMN via the SNPN is also referred to as the de-registration procedure or the present procedure.

The AMF_210 (hereinafter also referred to as the AMF) initiates the present procedure by transmitting a de-registration request (DEREGISTRATION REQUEST) message to the UE via the N3IWF_240 (hereinafter also referred to as the N3IWF) and the non-3GPP access (S900). Here, the non-3GPP access may include the access network_102, and the core network_202, and the DN_252. Note that the de-registration request message is a NAS message transmitted and/or received over the N1 interface.

The AMF may include at least one piece of identification information out of the 41st to 43rd identification information in the de-registration request message for transmission. Note that which of the 41st to 43rd identification information is included in the de-registration request message or not may be determined in accordance with the 1st identification information and/or 11th identification information and/or 24th identification information and/or 34th identification information transmitted and/or received in the procedure performed before the present procedure. For example, in a case that the 1st identification information and/or 11th identification information and/or 24th identification information and/or 34th identification information indicates that the handover between the PLMN and the SNPN is supported, in other words, in a case that the UE or the network supports the handover between the PLMN and the SNPN, the AMF may include at least one piece of identification information out of the 41st to 43rd identification information in the de-registration request message for transmission.

By transmitting at least one of these pieces of identification information and/or the de-registration request message, the AMF may request transitioning of the registered state of the UE in the PLMN via the SNPN to the deregistered state, and/or may request release of the PDU session established in the PLMN via the SNPN, and/or may indicate initiation of the registration procedure and/or the PDU session establishment procedure for the PLMN without using the SNPN, and/or may indicate initiation of a PDU session release procedure for releasing the PDU session established in the SNPN, and/or may indicate change from connection to the PLMN via the SNPN to direct connection to the PLMN, and/or may indicate change from a PDU session established for the PLMN via the SNPN to a PDU session directly established for the PLMN, and/or may indicate deactivation of the SNPN access mode, an/or indicate no operation in the SNPN access mode.

In a case of receiving the de-registration request message from the AMF, the UE can recognize the contents of each piece of identification information included in the de-registration request message. The UE may then determine the behavior of the UE based on the reception of the de-registration request message, and/or each piece of identification information.

In other words, the UE may transition the registered state of the UE in the PLMN via the SNPN to the deregistered state, or may release the PDU session established in the PLMN via the SNPN, or may initiate the registration procedure and/or the PDU session establishment procedure for the PLMN without using the SNPN, or may initiate the PDU session release procedure for releasing the PDU session established in the SNPN, or may perform processing for changing from connection to the PLMN via the SNPN to direct connection to the PLMN, or may deactivate the SNPN access mode, or may configure no operation in the SNPN access mode. These may be performed while the present procedure is being performed, or may be performed after completion of the present procedure.

Then, the UE that receives the de-registration request message may transmit the de-registration accept (DEREGISTRATION ACCEPT) message to the AMF using the non-3GPP access and the N3IWF (S902). Here, the de-registration accept message is a NAS message transmitted and/or received on the N1 interface.

Each apparatus may transition to a state in which the UE is not registered with the network (RM_DEREGISTERED state or 5GMM-DEREGISTERED state) based on the transmission and/or reception of the de-registration accept message. The state transition of each apparatus may be performed based on the completion of the present procedure.

Each apparatus may store pieces of information received in the present procedure in association with one another.

After completing the present procedure, the UE may be in the first state or the third state or the fourth state or the fifth state.

Note that in a case that the present procedure is performed using the non-3GPP access, the UE may be in the first state or the third state or the fourth state or the fifth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 4.8.

4.5.2 UE-Initiated De-Registration Procedure

Now, the UE-initiated de-registration procedure will be described by using FIGS. 3, 4, and 11. Hereinafter, the UE-initiated de-registration procedure in the PLMN is also referred to as the de-registration procedure or the present procedure. The UE initiates the present procedure by transmitting the de-registration request (DEREGISTRATION REQUEST) message to the AMF_210 (hereinafter also referred to as an AMF) using non-3GPP access and N3IWF_240 (also referred to as N3IWF) (S1000). Here, the non-3GPP access may include the access network_102, and the core network_202, and the DN_252. Here, the de-registration request message is a NAS message transmitted and/or received over the N1 interface.

The UE may include at least one piece of identification information out of the 51st to the 53rd identification information in the de-registration request message for transmission. Note that which of the 51st to 53rd identification information is included in the de-registration request message or not may be determined in accordance with the 1st identification information transmitted in the registration procedure performed before the present procedure, and/or the 24th identification information transmitted in the PDU session establishment procedure performed before the present procedure. For example, in a case that the 1st identification information and/or the 24th identification information indicates that the handover between the PLMN and the SNPN is supported, the UE may include at least one piece of identification information out of the 51st to 53rd identification information in the de-registration request message for transmission.

In a case of receiving the de-registration request message from the UE, the AMF may determine the behavior of the AMF based on the reception of the de-registration request message and/or identification information.

For example, in a case of receiving the de-registration request message, the AMF may transmit the de-registration accept (DEREGISTRATION ACCEPT) message to the UE via the N3IWF and the non-3GPP access (S1002). Here, the de-registration accept message is a NAS message transmitted and/or received over the N1 interface.

The AMF may include 62nd identification information in the de-registration accept message for transmission. Note that whether to include the 62nd identification information in the de-registration accept message may be determined in accordance with the 1st identification information acquired in the registration procedure performed before the present procedure and/or the 24th identification information acquired in the PDU session establishment procedure performed before the present procedure. For example, in a case that the 1st identification information and/or the 24th identification information indicates that the handover between the PLMN and the SNPN is supported, the AMF may include the 62nd identification information in the de-registration accept message for transmission.

By transmitting at least one of these pieces of identification information and/or the de-registration accept message, the AMF may request transitioning of the registered state of the UE in the PLMN via the SNPN to the deregistered state, and/or may request release of the PDU session established in the PLMN via the SNPN, and/or may indicate initiation of the registration procedure and/or the PDU session establishment procedure for the PLMN, and/or may indicate initiation of a PDU session release procedure for releasing the PDU session established in the SNPN, and/or may indicate change from connection to the PLMN via the SNPN to direct connection to the PLMN, and/or may indicate change from a PDU session established for the PLMN via the SNPN to a PDU session directly established for the PLMN, and/or may indicate activation of the SNPN access mode.

In a case of receiving the de-registration accept message from the AMF, the UE can recognize the contents of each piece of identification information included in the de-registration accept message. The UE may then determine the behavior of the UE based on the reception of the de-registration accept message and/or each piece of identification information.

In other words, the UE may transition the registered state of the UE in the PLMN via the SNPN to the deregistered state, or may release the PDU session established in the PLMN via the SNPN, or may initiate the registration procedure and/or the PDU session establishment procedure for the PLMN, or may initiate the PDU session release procedure for releasing the PDU session established in the SNPN, or may trigger performance of processing for changing from connection to the PLMN via the SNPN to direct connection to the PLMN.

Each apparatus may transition to a state in which the UE is not registered with the network (RM_DEREGISTERED state or 5GMM-DEREGISTERED state) based on the transmission and/or reception of the de-registration accept message. The state transition of each apparatus may be performed based on the completion of the present procedure.

Each apparatus may store pieces of information received in the present procedure in association with one another.

After completing the present procedure, the UE may be in the first state or the third state or the fourth state or the fifth state.

Note that in a case that the present procedure is performed using the non-3GPP access, the UE may be in the first state or the third state or the fourth state or the fifth state after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 4.8.

4.6. PDU Session Release Procedure in PLMN (Via SNPN)

Now, the PDU session release procedure in the PLMN via the SNPN will be described that is performed by the UE after performing the procedure in Section 4.4. Here, a case is described below in which the PDU session release procedure in the PLMN (via the SNPN) is performed via the same access (in other words, non-3GPP access) as an access for which the procedure in Section 4.3 or Section 4.4 is performed. In this case, the PDU session release procedure in the PLMN (via the SNPN) may be performed by the UE in the first state or the second state or the fifth state. Note that in a case that the procedure in Section 4.3 or Section 4.4 is performed using the 3GPP access, the UE in the first state or the second state or the fourth state may perform the PDU session release procedure in the PLMN (via the SNPN) using the 3GPP access. Hereinafter, the PDU session release procedure in the PLMN via the SNPN is also referred to as the PDU session release procedure or the present procedure. The PDU session release procedure includes a network-initiated PDU session release procedure and a UE-initiated PDU session release procedure. The PDU session release procedure may be a procedure for releasing a PDU session. In a case of detecting that the UE exits the area where the UE can communicate with the PLMN, each apparatus may perform the PDU session release procedure. In particular, in a case that a PDU session configured with SSC mode 2 is established, the present procedure may be performed.

In a case of completing the present procedure, the UE may be in a state in which the third PDU session in the PLMN via the SNPN is released for the UE. In other words, the UE may be in a state in which the UE remains in the registered state in the SNPN, and the second PDU session remains established. Note that the UE remains in the registered state in the PLMN via the SNPN, but may be in the deregistered state later.

4.6.1 Network-Initiated PDU Session Release Procedure

Now, the network-initiated PDU session release procedure will be described by using FIGS. 3, 4, and 12. Hereinafter, the network-initiated PDU session release procedure in the PLMN via the SNPN is also referred to as the PDU session release procedure or the present procedure. The SMF_220 (hereinafter also referred to as the SMF) initiates the present procedure by transmitting the PDU session release command (PDU SESSION RELEASE COMMAND) message to the UE via AMF_210 (hereinafter also referred to as the AMF), the N3IWF_240 (also referred to as the N3IWF), and the non-3GPP access (S1102). Here, the non-3GPP access may include the access network_102, and the core network_202, and the DN_252. Here, the PDU session release command message is a message included in a NAS message transmitted and/or received on the N1 interface.

The SMF may include at least one piece of identification information out of the 71st to 75th identification information in the PDU session release command message for transmission. Note that which of the 71st to 75th identification information is to be included in the PDU session release command message or not may be determined in accordance with the 1st identification information acquired in the registration procedure performed before the present procedure, and/or the 24th identification information acquired in the PDU session establishment procedure performed before the present procedure. For example, in a case that the 1st identification information and/or the 24th identification information indicates that the handover between the PLMN and the SNPN is supported, the SMF may include at least one piece of identification information out of the 71st to 75th identification information in the PDU session release command message for transmission. The 71st identification information may indicate PDU session ID #3 for identifying the third PDU session. The 74th identification information may indicate PDU session ID #2 for identifying the second PDU session. In a case that the PDU session release command message includes the 71st and 74th identification information, the 73rd identification information may indicate the 3GPP access and the non-3GPP access corresponding to the PDU sessions indicated by the 71st and 74th identification information. In a case that the PDU session release command message includes the 71st identification information but does not include the 74th identification information, the 73rd identification information may indicate the non-3GPP access corresponding to the PDU session indicated by the 71st identification information.

By transmitting at least one of these pieces of identification information and/or the PDU session release command message, the SMF may indicate release of the PDU session established in the PLMN via the SNPN, and/or may indicate initiation of the registration procedure and/or the PDU session establishment procedure for the PLMN without using the SNPN, and/or may indicate initiation of the PDU session release procedure for releasing the PDU session established in the SNPN, and/or may indicate change from connection to the PLMN via the SNPN to direct connection to the PLMN, and/or may indicate change of a PDU session established for the PLMN via the SNPN to a PDU session directly established for the PLMN, and/or may indicate deactivation of the SNPN access mode, and/or may indicate no operation in the SNPN access mode.

In a case of receiving the PDU session release command message from the SMF, the UE can recognize the contents of each piece of identification information included in the PDU session release command message. The UE may then determine the behavior of the UE based on the reception of the de-registration request message, and/or each piece of identification information.

In other words, the UE may release the PDU session established in the PLMN via the SNPN, or may initiate the registration procedure and/or the PDU session establishment procedure for the PLMN without using the SNPN, or may initiate the PDU session release procedure for releasing the PDU session established in the SNPN, or may determine change from connection to the PLMN via the SNPN to direct connection to the PLMN, or may perform processing for changing a PDU session established for the PLMN via the SNPN to a PDU session directly established for the PLMN, or may activate the SNPN access mode, or may configure operation in the SNPN access mode. These may be performed while the present procedure is being performed, or may be performed after completion of the present procedure.

The UE that receives the PDU session release command may transmit the PDU session release complete (PDU SESSION RELEASE COMPLETE) message to the SMF using the non-3GPP access, the N3IWF, and the AMF. Here, the PDU session release complete message is a message included in a NAS message transmitted and/or received on the N1 interface via the AMF.

Each apparatus may store pieces of information received in the present procedure in association with one another.

After completing the present procedure, the UE may be in the second state or the fourth state or the fifth state or the sixth state.

Note that in a case that the present procedure is performed using the 3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 4.7.

The UE may determine to initiate the procedure in Section 4.7 based on the PDU session release command including the 74th identification information, or based on reception of the PDU session release command including the 74th identification information. The UE may determine not to initiate the procedure in Section 4.7 based on the PDU session release command not including the 74th identification information, or based on reception of the PDU session release command not including the 74th identification information.

4.6.2 UE-Initiated PDU Session Release Procedure

Now, the UE-initiated PDU session release procedure will be described by using FIGS. 3, 4, and 12. Hereinafter, the UE-initiated PDU session release procedure in the PLMN via the SNPN is also referred to as the PDU session release procedure or the present procedure. The UE initiates the present procedure by transmitting the PDU session release request (PDU SESSION RELEASE REQUEST) message to the SMF_220 (hereinafter also referred to as the SMF) using the non-3GPP access, the N3IWF_240 (hereinafter also referred to as the N3IWF), and the AMF_210 (hereinafter also referred to as the AMF) (S1100). Here, the non-3GPP access may include the access network_102, and the core network_202, and the DN_252. Here, the PDU session release request message is a message included in a NAS message transmitted and/or received on the N1 interface.

The UE may include 81st identification information in the PDU session release request message for transmission. Note that which of the 81st identification information is included in the PDU session release request message or not may be determined in accordance with the 1st identification information transmitted in the registration procedure performed before the present procedure, and/or the 24th identification information transmitted in the PDU session establishment procedure performed before the present procedure. For example, in a case that the 1st identification information and/or the 24th identification information indicates that the handover between the PLMN and the SNPN is supported, the UE may include the 81st identification information in the PDU session release request message for transmission. Note that the 81st identification information may indicate PDU session ID #3 for identifying the third PDU session.

In a case of receiving the PDU session release request message from the UE, the SMF may determine the behavior of the SMF based on the reception of the PDU session release request message.

For example, the SMF may include at least one piece of identification information out of the 71st to 75th identification information, in the PDU session release command message for transmission (S1102). Note that which of the 71st to 75th identification information is to be included in the PDU session release command message or not may be determined in accordance with the 1st identification information acquired in the registration procedure performed before the present procedure, and/or the 24th identification information acquired in the PDU session establishment procedure performed before the present procedure. For example, in a case that the 1st identification information and/or the 24th identification information indicates that the handover between the PLMN and the SNPN is supported, the SMF may include at least one piece of identification information out of the 71st to 75th identification information in the PDU session release command message for transmission. The 71st identification information may indicate PDU session ID #3 for identifying the third PDU session. The 74th identification information may indicate PDU session ID #2 for identifying the second PDU session. In a case that the PDU session release command message includes the 71st and 74th identification information, the 73rd identification information may indicate the 3GPP access and the non-3GPP access corresponding to the PDU sessions indicated by the 71st and 74th identification information. In a case that the PDU session release command message includes the 71st identification information but does not include the 74th identification information, the 73rd identification information may indicate the non-3GPP access corresponding to the PDU session indicated by the 71st identification information.

By transmitting at least one of these pieces of identification information and/or the PDU session release command message, the SMF may indicate release of the PDU session established in the PLMN via the SNPN, and/or may indicate initiation of the registration procedure and/or the PDU session establishment procedure for the PLMN without using the SNPN, and/or may indicate initiation of the PDU session release procedure for releasing the PDU session established in the SNPN, and/or may indicate change from connection to the PLMN via the SNPN to direct connection to the PLMN, and/or may indicate change of a PDU session established for the PLMN via the SNPN to a PDU session directly established for the PLMN, and/or may indicate activation of the SNPN access mode.

In a case of receiving the PDU session release command message from the SMF, the UE can recognize the contents of each piece of identification information included in the PDU session release command message. The UE may then determine the behavior of the UE based on the reception of the de-registration request message, and/or each piece of identification information.

In other words, the UE may release the PDU session established in the PLMN via the SNPN, or may initiate the registration procedure and/or the PDU session establishment procedure for the PLMN, or may initiate the PDU session release procedure for releasing the PDU session established in the SNPN, or may determine change from connection to the PLMN via the SNPN to direct connection to the PLMN, or may determine change of a PDU session established for the PLMN via the SNPN to a PDU session directly established for the PLMN.

The UE that receives the PDU session release command may transmit the PDU session release complete (PDU SESSION RELEASE COMPLETE) message to the SMF using the non-3GPP access, the N3IWF, and the AMF. Here, the PDU session release complete message is a message included in a NAS message transmitted and/or received on the N1 interface via the AMF.

Each apparatus may store pieces of information received in the present procedure in association with one another.

After completing the present procedure, the UE may be in the second state or the fourth state or the fifth state or the sixth state.

Note that in a case that the present procedure is performed using the 3GPP access, the UE may be in the second state or the fourth state or the fifth state or the sixth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 4.7.

The UE may determine to initiate the procedure in Section 4.7 based on the PDU session release command including the 74th identification information, or based on reception of the PDU session release command including the 74th identification information. The UE may determine not to initiate the procedure in Section 4.7 based on the PDU session release command not including the 74th identification information, or based on reception of the PDU session release command not including the 74th identification information.

4.7. PDU Session Release Procedure for SNPN

The present procedure is performed after the procedure in Section 4.6 is performed. Now, the UE-initiated PDU session release procedure will be described by using FIGS. 3, 4, and 12. Here, a case is described below in which the PDU session release procedure in the SNPN is performed via an access (i.e., 3GPP access) different from an access for which the procedure in Section 4.6 is performed. In this case, the PDU session release procedure in the SNPN may be performed by the UE in the second state or the fifth state or the sixth state. Note that in a case that the procedure in Section 4.6 is performed using the 3GPP access, the UE in the first state or the second state or the fourth state may perform the PDU session release procedure in the SNPN using the non-3GPP access. Hereinafter, the UE-initiated PDU session release procedure in the SNPN is also referred to as the PDU session release procedure or the present procedure. The UE initiates the present procedure by transmitting the PDU session release request (PDU SESSION RELEASE REQUEST) message to the SMF_222 (hereinafter also referred to as the SMF) using the 3GPP access (access network_102) and the AMF_212 (also referred to as the AMF) (S1100). Here, the PDU session release request message is a message included in a NAS message transmitted and/or received on the N1 interface.

The UE may include 81st identification information in the PDU session release request message for transmission. Note that which of the 81st identification information is included in the PDU session release request message or not may be determined in accordance with the 1st identification information transmitted in the registration procedure performed before the present procedure, and/or the 24th identification information transmitted in the PDU session establishment procedure performed before the present procedure. For example, in a case that the 1st identification information and/or the 24th identification information indicates that the handover between the PLMN and the SNPN is supported, the UE may include the 81st identification information in the PDU session release request message for transmission. Note that the 81st identification information may indicate PDU session ID #2 for identifying the second PDU session.

In a case of receiving the PDU session release request message from the UE, the SMF may determine the behavior of the SMF based on the reception of the PDU session release request message.

For example, the SMF may include at least one piece of identification information out of the 71st to 73rd identification information and the 75th identification information in the PDU session release command message for transmission (S1102). Note that which of the 71st to 73rd identification information and the 75th identification information is included in the PDU session release command message or not may be determined in accordance with the 1st identification information acquired in the registration procedure performed before the present procedure, and/or the 24th identification information acquired in the PDU session establishment procedure performed before the present procedure. For example, in a case that the 1st identification information and/or the 24th identification information indicates that the handover between the PLMN and the SNPN is supported, the SMF may include at least one piece of identification information out of the 71st to 73rd identification information and the 75th identification information in the PDU session release command message for transmission. Note that the 71st identification information may indicate PDU session ID #2 for identifying the second PDU session.

By transmitting at least one of these pieces of identification information and/or the PDU session release command message, the SMF may indicate release of the PDU session established in the SNPN, and/or may indicate initiation of the registration procedure and/or the PDU session establishment procedure for the PLMN, and/or may indicate change from connection to the PLMN via the SNPN to direct connection to the PLMN, and/or may indicate change of a PDU session established for the PLMN via the SNPN to a PDU session directly established for the PLMN, and/or may indicate activation of the SNPN access mode.

In a case of receiving the PDU session release command message from the SMF, the UE can recognize the contents of each piece of identification information included in the PDU session release command message. The UE may then determine the behavior of the UE based on the reception of the de-registration request message, and/or each piece of identification information.

In other words, the UE may release the PDU session established in the SNPN, or may initiate the registration procedure and/or the PDU session establishment procedure for the PLMN, or may determine change from connection to the PLMN via the SNPN to direct connection to the PLMN, or may determine change of a PDU session established for the PLMN via the SNPN to a PDU session directly established for the PLMN.

The UE that receives the PDU session release command may transmit the PDU session release complete (PDU SESSION RELEASE COMPLETE) message to the SMF using the non-3GPP access, the N3IWF, and the AMF. Here, the PDU session release complete message is a message included in a NAS message transmitted and/or received on the N1 interface via the AMF.

Each apparatus may store pieces of information received in the present procedure in association with one another.

After completing the present procedure, the UE may be in the first state or the third state or the fourth state or the fifth state.

Note that in a case that the present procedure is performed using the non-3GPP access, the UE may be in the first state or the third state or the fourth state or the fifth state even after completing the present procedure.

Note that these states may be maintained or transitioned based on the information and control messages transmitted and/or received in this procedure, or may be maintained or transitioned based on the information and control messages transmitted and/or received in procedures performed prior to this procedure.

The UE in these states may then perform the procedure in Section 4.8.

In a case of completing the present procedure, the UE may be in a state in which the second PDU session in the SNPN is released for the UE. Note that at the time of completion of the present procedure, the UE remains in the registered state in the SNPN, but may be in the deregistered state later.

4.8. Registration Procedure for PLMN

The present procedure may be performed after the procedure from Section 4.1 to Section 4.4 is performed. The present procedure may also be performed after the procedure in Section 4.5 or 4.6 is performed after the procedure from Section 4.1 to Section 4.4 is performed. The present procedure may also be performed after the procedure from Section 4.6 to Section 4.7 is performed after the procedure from Section 4.1 to Section 4.4 is performed. As the present procedure, the procedure in Section 3.1 can be directly applied without any change. Thus, see Section 3.1.

Note that the UE in the first state or the third state or the fourth state may perform the present procedure using the 3GPP access. In this case, after completing the present procedure, the UE may be in a state in which the UE is registered in the PLMN. Even after completing the present procedure, the UE may be in the first state or the third state or the fourth state.

The UE in the first state or the third state or the fifth state may perform the present procedure using the non-3GPP access. In this case, after completing the present procedure, the UE may be in a state in which the UE is registered in the PLMN. Even after completing the present procedure, the UE may be in the first state or the third state or the fifth state.

4.9. PDU Session Establishment Procedure for PLMN

The present procedure may be performed after the procedure in Section 4.8 is performed. As the present procedure, the procedure in Section 3.2 can be directly applied without any change. Thus, see Section 3.2.

Note that the UE in the first state or the third state or the fourth state may perform the present procedure using the 3GPP access. In this case, after completing the present procedure, the UE may be in a state in which the UE has established a PDU session in the PLMN (first PDU session identified by PDU session ID #1). Even after completing the present procedure, the UE may be in the first state or the third state or the fourth state.

The UE in the first state or the third state or the fifth state may perform the present procedure using the non-3GPP access. In this case, after completing the present procedure, the UE may be in a state in which the UE has established a PDU session in the PLMN (first PDU session identified by PDU session ID #1). Even after completing the present procedure, the UE may be in the first state or the third state or the fifth state.

As described above, by performing each procedure, the third PDU session can be transferred to the first PDU session.

5. Modified Examples

A program running on an apparatus according to an aspect of the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to an aspect of the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, it is possible for one or multiple aspects of the present invention to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A User Equipment (UE) comprising:
a controller, wherein
in a case of accessing a Public Land Mobile Network (PLMN) service via a Stand-alone Non-Public Network (SNPN) using 3GPP access, the controller does not operate in an SNPN access mode over non-3GPP access.

2. The UE according to claim 1, wherein
in a case of accessing the PLMN service via the SNPN using the 3GPP access, the controller further operates in the SNPN access mode over the 3GPP access.

3. A communication control method performed by a User Equipment (UE), the communication control method comprising:
in a case of accessing a Public Land Mobile Network (PLMN) service via a Stand-alone Non-Public Network (SNPN) using 3GPP access, not operating in an SNPN access mode over non-3GPP access.

* * * * *